United States Patent
Kouroussis et al.

(10) Patent No.: US 11,810,744 B2
(45) Date of Patent: Nov. 7, 2023

(54) SELECTIVE COORDINATION OF SOLID-STATE CIRCUIT BREAKERS AND MECHANICAL CIRCUIT BREAKERS IN ELECTRICAL DISTRIBUTION SYSTEMS

(71) Applicant: Atom Power, Inc., Huntersville, NC (US)

(72) Inventors: Denis Kouroussis, Markham (CA); Ryan Kennedy, Cornelius, NC (US)

(73) Assignee: Atom Power, Inc., Charlotte, NC (US)

( * ) Notice: Subject to any disclaimer, the term of this patent is extended or adjusted under 35 U.S.C. 154(b) by 0 days.

(21) Appl. No.: 17/235,164

(22) Filed: May 10, 2023

(65) Prior Publication Data

US 2021/0241989 A1  Aug. 5, 2021

Related U.S. Application Data

(63) Continuation of application No. 16/382,590, filed on Apr. 12, 2019, now Pat. No. 11,037,749.
(Continued)

(51) Int. Cl.
*H01H 71/10* (2006.01)
*H02H 3/16* (2006.01)
*H01H 71/12* (2006.01)

(52) U.S. Cl.
CPC ...... *H01H 71/1081* (2013.01); *H01H 71/123* (2013.01); *H02H 3/165* (2013.01); *H02H 3/167* (2013.01)

(58) Field of Classification Search
CPC ........ H02H 3/165; H02H 3/167; H02H 3/021; H02H 3/08; H02H 3/025; H02H 9/02;
(Continued)

(56) References Cited

U.S. PATENT DOCUMENTS 3,629,747 A   12/1971   Findley, Jr.
4,316,256 A   2/1982    Hendricks et al.
(Continued)

FOREIGN PATENT DOCUMENTS

CN   1375923 A    10/2002
CN   1558248 A    12/2004
(Continued)

OTHER PUBLICATIONS

Author Unknown, "Solid State Relay," Product Overview, datasheetspdf.com/pdf-file/789345/ANV/SSR-80DA/1 > (Year 2014), ANV, 12 pages.
(Continued)

*Primary Examiner* — Bryan R Perez
(74) *Attorney, Agent, or Firm* — Withrow & Terranova, P.L.L.C.

(57) ABSTRACT

In an electrical distribution system including a solid-state circuit breaker (SSCB) and one or more downstream mechanical circuit breakers (CBs), a solid-state switching device in the SSCB is repeatedly switched ON and OFF during a short circuit event, to reduce a root-mean-square (RMS) value of the short circuit current. The resulting pulsed short circuit current is regulated in a hysteresis control loop, to limit the RMS to a value low enough to prevent the SSCB from tripping prematurely but high enough to allow one of the downstream mechanical CBs to trip and isolate the short circuit. Pulsing is allowed to continue for a maximum short circuit pulsing time. Only if none of the downstream mechanical CBs is able to trip to isolate the short circuit within the maximum short circuit pulsing time is the SSCB allowed to trip.

18 Claims, 14 Drawing Sheets

Related U.S. Application Data

(60) Provisional application No. 62/667,114, filed on May 4, 2018.

(58) Field of Classification Search
CPC ............ H02H 7/26; H02H 7/30; H01H 9/548; H01H 9/542; H01H 71/1081; H01H 71/123; H01H 71/04; H01H 71/1009; H01H 9/02
See application file for complete search history.

(56) References Cited

U.S. PATENT DOCUMENTS

| | | | |
|---|---|---|---|
| 4,644,438 | A | 2/1987 | Puccinelli et al. |
| D288,921 | S | 3/1987 | Peck |
| D305,019 | S | 12/1989 | Pena et al. |
| 5,132,865 | A | 7/1992 | Mertz et al. |
| D331,063 | S | 11/1992 | Pasierb |
| D334,542 | S | 4/1993 | Lowe et al. |
| D351,861 | S | 10/1994 | Anderson et al. |
| 5,502,286 | A | 3/1996 | Pollman et al. |
| 5,638,038 | A | 6/1997 | Suzuki et al. |
| D393,808 | S | 4/1998 | Lindsey et al. |
| 5,782,341 | A | 7/1998 | Calder et al. |
| 5,951,340 | A | 9/1999 | Mueller et al. |
| 6,008,971 | A | 12/1999 | Duba et al. |
| D435,021 | S | 12/2000 | Davis et al. |
| D443,586 | S | 6/2001 | Sakasegawa |
| D443,595 | S | 6/2001 | Pawley |
| 6,788,508 | B2 | 9/2004 | Papallo, Jr. et al. |
| 6,887,084 | B2 | 5/2005 | Saito et al. |
| 7,453,678 | B2 | 11/2008 | Beneditz et al. |
| 7,816,815 | B2 | 10/2010 | Sicilliano et al. |
| 8,582,265 | B2 | 11/2013 | Britz |
| D695,234 | S | 12/2013 | Santiago et al. |
| D697,033 | S | 1/2014 | Hashimoto et al. |
| 8,687,357 | B2 | 4/2014 | Nagano et al. |
| 8,861,162 | B2 | 10/2014 | Fuller et al. |
| 9,287,065 | B1 | 3/2016 | Davis et al. |
| D754,615 | S | 4/2016 | Chen et al. |
| D768,582 | S | 10/2016 | Jacoby et al. |
| D784,168 | S | 4/2017 | Jacoby et al. |
| 9,692,195 | B2 | 6/2017 | Mittelstadt et al. |
| 10,134,551 | B2 | 11/2018 | Potter et al. |
| 10,276,321 | B2 | 4/2019 | Kennedy et al. |
| 10,541,530 | B2 | 1/2020 | Kennedy et al. |
| 2001/0026185 | A1 | 10/2001 | Sher |
| 2002/0093774 | A1 | 7/2002 | Chung |
| 2004/0113804 | A1 | 6/2004 | Cabrera et al. |
| 2007/0121257 | A1 | 5/2007 | Maitra et al. |
| 2007/0195470 | A1* | 8/2007 | Zhang .................... H02H 3/335 361/42 |
| 2008/0215278 | A1 | 9/2008 | Colsch et al. |
| 2008/0225448 | A1 | 9/2008 | Li et al. |
| 2009/0206059 | A1 | 8/2009 | Kiko |
| 2009/0290275 | A1 | 11/2009 | Staszesky et al. |
| 2010/0118458 | A1 | 5/2010 | Coffey |
| 2010/0232082 | A1 | 9/2010 | Seger |
| 2011/0026185 | A1 | 2/2011 | Boudet et al. |
| 2011/0080677 | A1 | 4/2011 | Radosavljevic et al. |
| 2011/0102052 | A1 | 5/2011 | Billingsley et al. |
| 2011/0149483 | A1 | 6/2011 | Diaz et al. |
| 2011/0222200 | A1* | 9/2011 | Fuller .................... H01H 9/548 361/100 |
| 2011/0292556 | A1 | 12/2011 | Britz |
| 2012/0085520 | A1 | 4/2012 | Pfaffinger |
| 2012/0218676 | A1 | 8/2012 | Demetriades et al. |
| 2013/0027829 | A1 | 1/2013 | Antoniazzi et al. |
| 2014/0029153 | A1 | 1/2014 | Besana et al. |
| 2014/0218838 | A1 | 8/2014 | Mannino et al. |
| 2015/0022928 | A1 | 1/2015 | Mohaddes Khorassani |
| 2015/0084420 | A1 | 3/2015 | Dickerson et al. |
| 2015/0109077 | A1 | 4/2015 | Tomimbang et al. |
| 2015/0236502 | A1 | 8/2015 | Xu et al. |
| 2015/0326001 | A1 | 11/2015 | Emerson et al. |
| 2015/0348722 | A1 | 12/2015 | Fraser et al. |
| 2016/0197465 | A1 | 7/2016 | Poulose et al. |
| 2016/0243951 | A1 | 8/2016 | Pritelli et al. |
| 2016/0294179 | A1 | 10/2016 | Kennedy et al. |
| 2016/0314928 | A1 | 10/2016 | Niehoff |
| 2016/0322802 | A1 | 11/2016 | Coffey et al. |
| 2017/0004948 | A1 | 1/2017 | Leyh |
| 2017/0063051 | A1 | 3/2017 | Sharp |
| 2017/0069441 | A1 | 3/2017 | Mishrikey et al. |
| 2017/0256934 | A1 | 9/2017 | Kennedy et al. |
| 2017/0349279 | A1* | 12/2017 | Garcia-Gabin ......... F24S 40/90 |
| 2018/0366936 | A1 | 12/2018 | Kennedy et al. |
| 2019/0103742 | A1 | 4/2019 | Kennedy et al. |
| 2019/0157021 | A1 | 5/2019 | Kennedy et al. |
| 2019/0341213 | A1 | 11/2019 | Kouroussis et al. |
| 2020/0083699 | A1 | 3/2020 | Kennedy et al. |
| 2020/0365346 | A1 | 11/2020 | Telefus et al. |
| 2020/0395739 | A1 | 12/2020 | Santore et al. |
| 2020/0395748 | A1 | 12/2020 | Miller et al. |
| 2021/0066013 | A1 | 3/2021 | Kumar et al. |
| 2021/0126447 | A1 | 4/2021 | Miller et al. |
| 2021/0241989 | A1 | 8/2021 | Kouroussis et al. |

FOREIGN PATENT DOCUMENTS

| | | |
|---|---|---|
| CN | 101297450 A | 10/2008 |
| CN | 102263397 A | 11/2011 |
| CN | 103578820 A | 2/2014 |
| EP | 3041101 A1 | 7/2016 |
| WO | 9312566 A1 | 6/1993 |
| WO | 2017215536 A1 | 12/2017 |

OTHER PUBLICATIONS

Author Unknown, "Eaton's New Narrow Fame Power and Air Circuit Breaker Offers Reduced Size and Improved Safety," Product Overview, Jun. 23, 2009, eaton.com/Eaton/OurCompany/newevents/newsreleases/CT_238199, 2 pages.

Author Unknown, "Lighted On/Off Dual Push Button," dated Apr. 26, 2014, www.signaworks.com/products/industrial-push-buttons/dual-on/off-push-button.html, Signaworks, 1 page.

Author Unknown, "Function and rated characteristics of circuit breaker—all things need to know of circuit breaker," Circuit Breaker, Electrical Engineering Blog, Nov. 20, 2013, eblogbd.com/details-characteristics-circuit-breaker/, 5 pages.

Harris, "Enabling a Solid State Circuit Breaker," Apr. 30, 2019, freedm.ncsu.edu/wp-content/uploads/2019/04/Harris-Atom-Power-SSCB.pdf, Atom Power, Inc., 25 pages.

Kiedaisch, Jill, "How the World's First Digital Circuit Breaker Could Completely Change the Powered World," Popular Mechanics, May 22, 2019. www.popularmechanics.com/technology/infrastructure/a27557804/digital-circuit-breaker/, 5 pages.

Meckler, Peter, "Does an Electronic Circuit Breaker need Electrical Contacts?," Proceedings of the 50th IEEE Holm Conference on Electrical Contacts and The 22nd International Conference on Electrical Contacts, 2004, pp. 480-487.

Author Unknown, "I-Line Busway" Product Overview, dated Jun. 10, 2019, www.schneider-electric.us/en/product-range-download/7550-i-line-busway/%23tabs-top, Schneider Electric, 3 pages.

Author Unknown, "Senior Design Team Works with Atom Power to Design Revolutionary Circuit Breaker," dated Jan. 29, 2016, isl.uncc.edu/news/2016-01-29/senior-design-team-works-tom-power-design-revolutionary-circuit-breaker, UNC Charlotte, 1 page.

First Office Action for Chinese Patent Application No. 201780014631.0, dated May 10, 2019, 14 pages.

Second Office Action for Chinese Patent Application No. 201780014631.0, dated Dec. 16, 2019, 7 pages.

Third Office Action for Chinese Patent Application No. 201780014631.0, dated Jun. 3, 2020, 18 pages.

Partial Supplementary European Search Report for European Patent Application No. 17760556.5, dated Sep. 18, 2019, 10 pages.

Extended European Search Report for European Patent Application No. 17760556.5, dated Jan. 30, 2020, 11 pages.

Intention to Grant for European Patent Application No. 17760556.5, dated Sep. 16, 2020, 5 pages.

(56) References Cited

OTHER PUBLICATIONS

Extended European Search Report for European Patent Application No. 20196282.6, dated Dec. 4, 2020, 7 pages.
Intention to Grant for European Patent Application No. 20196282.6, dated May 13, 2022, 5 pages.
International Search Report and Written Opinion for International Patent Application No. PCT/US17/19754, dated Jul. 14, 2017.
Extended European Search Report for European Patent Application No. 19183023.1, dated Feb. 5, 2020, 8 pages.
Intention to Grant for European Patent Application No. 19183023.1, dated May 2, 2022, 5 pages.
Extended European Search Report for European Patent Application No. 22212343.2, dated Feb. 22, 2023, 7 pages.
International Search Report and Written Opinion for International Patent Application No. PCT/US2020/37158, dated Sep. 18, 2020, 13 pages.
Partial Supplementary European Search Report for European Patent Application No. 20823677.8, dated Jun. 7, 2023, 10 pages.
International Search Report and Written Opinion for International Patent Application No. PCT/US2020/37163, dated Sep. 21, 2020, 11 pages.
International Search Report and Written Opinion for International Patent Application No. PCT/US20/49018, dated Jan. 21, 2021, 15 pages.
Non-Final Office Action for U.S. Appl. No. 15/443,736, dated May 30, 2019, 14 pages.
Final Office Action for U.S. Appl. No. 15/443,736, dated Oct. 7, 2019, 6 pages.
Notice of Allowance for U.S. Appl. No. 15/443,736, dated Oct. 30, 2019, 8 pages.
Non-Final Office Action for U.S. Appl. No. 16/898,569, dated Nov. 22, 2021, 9 pages.
Notice of Allowance for U.S. Appl. No. 16/898,569, dated Mar. 8, 2022, 7 pages.
Notice of Allowance for U.S. Appl. No. 17/697,223, dated Dec. 2, 2022, 5 pages.
Non-Final Office Action for U.S. Appl. No. 16/382,590, dated Apr. 7, 2021, 10 pages.
Notice of Allowance for U.S. Appl. No. 16/382,590, dated May 4, 2021, 7 pages.
Non-Final Office Action for U.S. Appl. No. 17/235,164, dated Mar. 1, 2023, 10 pages.
Non-Final Office Action for U.S. Appl. No. 16/898,538, dated Nov. 29, 2021, 20 pages.
Notice of Allowance for U.S. Appl. No. 16/898,538, dated Mar. 15, 2022, 9 pages.
Non-Final Office Action for U.S. Appl. No. 17/010,122, dated Sep. 16, 2021, 11 pages.
Final Office Action for U.S. Appl. No. 17/010,122, dated Apr. 5, 2022, 31 pages.
Notice of Allowance for U.S. Appl. No. 17/010,122, dated Jul. 19, 2022, 9 pages.
Non-Final Office Action for U.S. Appl. No. 17/116,183, dated Mar. 22, 2023, 10 pages.
First Office Action for Chinese Patent Application No. 201910649875.7, dated Jul. 6, 2023, 17 pages.
Extended European Search Report for European Patent Application No. 20822714.0, dated Jul. 3, 2023, 13 pages.
Notice of Allowance for U.S. Appl. No. 17/116, 183, dated Jul. 13, 2023, 9 pages.
Extended European Search Report for European Patent Application No. 20823677.8, dated Sep. 7, 2023, 14 pages.

* cited by examiner

| CB Manufacturer | Model No. | CB Current Rating (Amps) | Trip Time (ms) @600A RMS |
|---|---|---|---|
| ABC Corp. | ABC-1 | 15 | 4 |
| | ABC-2 | 20 | 5 |
| | ⋮ | ⋮ | ⋮ |
| | ABC-m | 30 | 6 |
| DEF Corp. | DEF-1 | 40 | 7 |
| | DEF-2 | 50 | 8 |
| | ⋮ | ⋮ | ⋮ |
| | DEF-n | 200 | 10 |
| ⋮ | ⋮ | ⋮ | ⋮ |
| XYZ Corp. | XYZ-1 | 15 | 5 |
| | XYZ-2 | 20 | 6 |
| | ⋮ | ⋮ | ⋮ |
| | XYZ-p | 30 | 7 |

SELECTIVE COORDINATION OF SOLID-STATE CIRCUIT BREAKERS AND MECHANICAL CIRCUIT BREAKERS IN ELECTRICAL DISTRIBUTION SYSTEMS

CROSS-REFERENCE TO RELATED APPLICATIONS

This application is a continuation of U.S. patent application Ser. No. 16/382,590, filed Apr. 12, 2019, and claims the benefit of U.S. Provisional Patent Application No. 62/667,114, filed May 4, 2018.

BACKGROUND OF THE INVENTION

Circuit breakers are used in electrical distribution systems to protect electrical circuits from abnormally high currents caused by faults and overloads. When a circuit breaker detects a fault or prolonged and unacceptably high overload it responds by "breaking" its circuit to prevent potentially harmful overcurrents from flowing in the circuit. Conventional circuit breakers typically include a thermally responsive bimetallic strip that separates the circuit breaker's contacts after a high overcurrent has flowed in the circuit for an unacceptably long time and an electromagnet that operates to separate the breaker's contacts as soon as possible when a large current surges in the circuit, which may be caused by a short circuit, for example.

Conventional mechanical circuit breakers are limited in their ability to react quickly to faults, typically requiring several milliseconds to detect and fully isolate faults. The slow reaction time is undesirable since it increases the risk of damage to electrical equipment and the possibility of fire in the circuit's electrical wiring. Another drawback of conventional mechanical circuit breakers is that during the time that their contacts are being opened, high-voltage electrical arcs develop and appear across the contacts. The electrical arcs are undesirable since they can create ionized gases and molten and vaporized metal, which can weld the contacts back together, thus creating additional short circuits. In some circumstances, arcing can also cause the circuit breaker to explode. To guard against these problems, conventional circuit breakers, especially, those used in high-voltage environments, usually include some sort of arc-containing or arc-extinguishing apparatus, such as arc chutes that divide and cool the arcs, compressed air that blows out the arcs, oil-filled chambers that envelopes the breakers' contacts, or jet chambers that blast vaporized oil through the arcs.

Recently, efforts have been made to adapt high-power semiconductors (i.e., "solid-state" devices) for circuit breaker applications. By replacing the mechanically manipulated contacts of a conventional mechanical circuit breaker with a high-power solid-state switch, the problem of arcing within the solid-state circuit breaker is obviated and complicated arc containing/extinguishing apparatus within the breaker is no longer needed. Solid-state devices are also attractive since they are capable of reacting to faults much more rapidly than mechanical circuit breakers, for example, in several microseconds rather than several milliseconds. Further, because the current-voltage characteristics of solid-state devices are precise and vary little from one device to another, circuit breakers constructed from solid-state devices can be manufactured to have time-current characteristics that are nearly identical from one solid-state circuit breaker to another. This is unlike conventional mechanical circuit breakers, which due to their thermal, magnetic, and mechanical construction exhibit wide variances in their time-current characteristics, even among breakers of the same type and rating provided by the same manufacturer. Finally, since solid-state devices are electronically controlled, they are much better suited for so-called "smart" distribution of electrical power.

Although solid-state circuit breakers are no doubt an attractive alternative to conventional mechanical circuit breakers, in some circumstances it is necessary or desirable to use both solid-state circuit breakers and mechanical circuit breakers in the same electrical distribution system. For example, it may be necessary or desirable to configure or adapt a solid-state circuit breaker to serve as the "main" breaker in an electrical distribution network containing a plurality of downstream mechanical circuit breakers, such as in a distribution panel, for example. Various problems are encountered in this type of application, however. One problem is the "selective coordination" of the solid-state circuit breaker among the several downstream mechanical circuit breakers. Selective coordination is one step performed by an engineer in the design of an electrical distribution system. If properly completed, when a fault occurs in the resulting distribution system, only those sections in the distribution system that are downstream from the fault are electrically isolated and de-energized. In this way, upstream breakers are not unnecessarily tripped and other sections of the distribution system unaffected by the fault can continue operating. Unfortunately, due to the disparate time-current characteristics of mechanical and solid-state circuit breakers, selectively coordinating a solid-state circuit breaker in an electrical distribution system containing downstream mechanical circuit breakers is difficult to achieve. The present invention addresses this problem.

BRIEF SUMMARY OF THE INVENTION

Methods, systems, and apparatus for selectively coordinating a solid-state circuit breaker (SSCB) among one or more downstream mechanical circuit breakers (CBs) in an electrical distribution system are disclosed. The SSCB includes a solid-state switching device through which current is directed and distributed to the one or more downstream mechanical CBs, for example, into one or more downstream branch circuits protected by the one or more mechanical CBs. When a short circuit current is determined to be flowing somewhere in the electrical distribution system, a controller in the SSCB directs a driver to repeatedly switch the solid-state switching device ON and OFF, in order to reduce a root-mean-square (RMS) value of the short circuit current. In one embodiment of the invention, the pulsed short circuit current is regulated in a hysteresis control loop, to limit the RMS of the pulsed short circuit current to a value low enough to prevent the SSCB from tripping prematurely but high enough to allow one of the downstream mechanical CBs to trip and isolate the short circuit. Pulsing is allowed to continue for a maximum short circuit pulsing time. Only if none of the downstream mechanical CBs is able to trip to isolate the short circuit within the maximum short circuit pulsing time is the SSCB allowed to trip.

Further features and advantages of the invention, including a detailed description of the above-summarized and other exemplary embodiments of the invention, will now be described in detail with respect to the accompanying drawings, in which like reference numbers are used to indicate identical or functionally similar elements.

BRIEF DESCRIPTION OF THE DRAWINGS

FIG. 13 is a conceptual drawing of a CB time-current library the user computer depicted in FIGS. 9 and 10 accesses to determine the time and current parameters the microcontroller in the SSCB uses in the selective coordination method depicted in FIG. 5;

DETAILED DESCRIPTION

Figure 1:
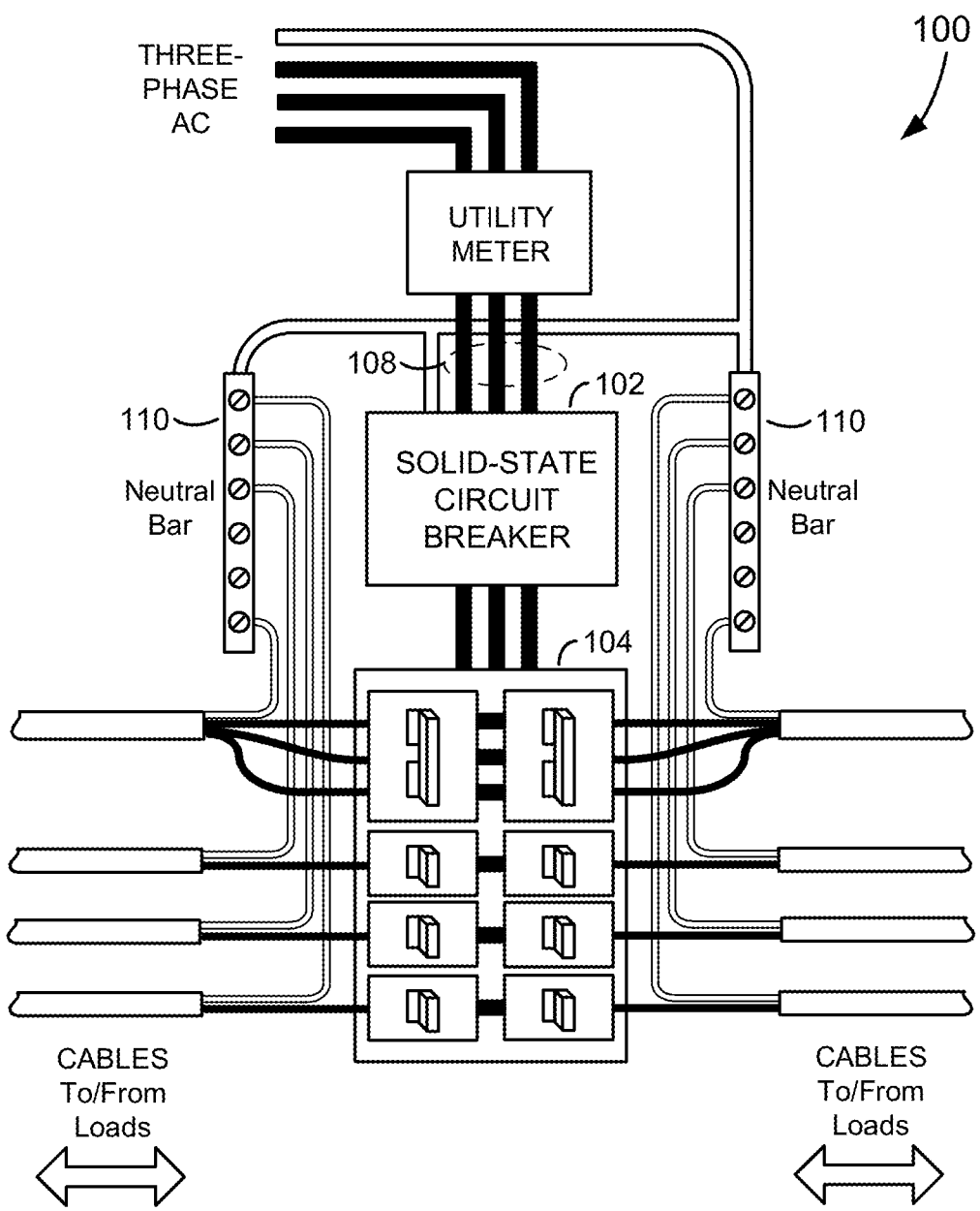
FIG. 1 is a drawing of an electrical distribution system including a solid-state circuit breaker (SSCB) and a plurality of downstream mechanical circuit breakers (CBs), according to an embodiment of the present invention.

Referring to FIG. 1, there is shown a drawing of an electrical distribution system 100, according to an embodiment of the present invention. The principal components of the electrical distribution system 100 include a solid-state circuit breaker (SSCB) 102 and a plurality of downstream mechanical circuit breakers (CBs) 104. The electrical distribution system 100 is configured to receive three-phase alternating current (AC) electrical power from an AC source, for example the AC mains. The received AC power is passed through a utility meter 106, through the SSCB 102, and then distributed to a plurality of loads via the plurality of downstream mechanical CBs 104.

In the exemplary distribution system 100 depicted in FIG. 1 the SSCB 102 is configured to serve as a "main" circuit breaker. Accordingly, it has an amperage rating greater than the sum of the amperage ratings of the downstream mechanical CBs 104. As will be explained in detail below, the SSCB 102 is configured to "trip" and remain OFF only in circumstances during which a downstream fault cannot be properly isolated by one or more of the downstream mechanical CBs 104. In other words, the SSCB 102 is "selectively coordinated" with respect to the plurality of mechanical CBs 104.

The SSCB 102 and plurality of mechanical CBs 104 are shown in FIG. 1 as being configured within an electrical distribution panel, which includes power "hot" bus bars 108 and neutral bars 110, similar to as in a typical electrical distribution panel. It should be mentioned, however, that configuration within an electrical distribution panel is not necessary, insofar as the invention is concerned, and the selective coordination method described in detail below can be applied in circumstances where there is but just a single mechanical CB 104 downstream from the SSCB 102. It should also be noted that although the selective coordination method is described in the context of a three-phase electrical distribution system, it can be modified and adapted for use in single-phase electrical distribution systems and direct current (DC) electrical power distribution systems, as will be appreciated by those of skill in the art.

Figure 2:
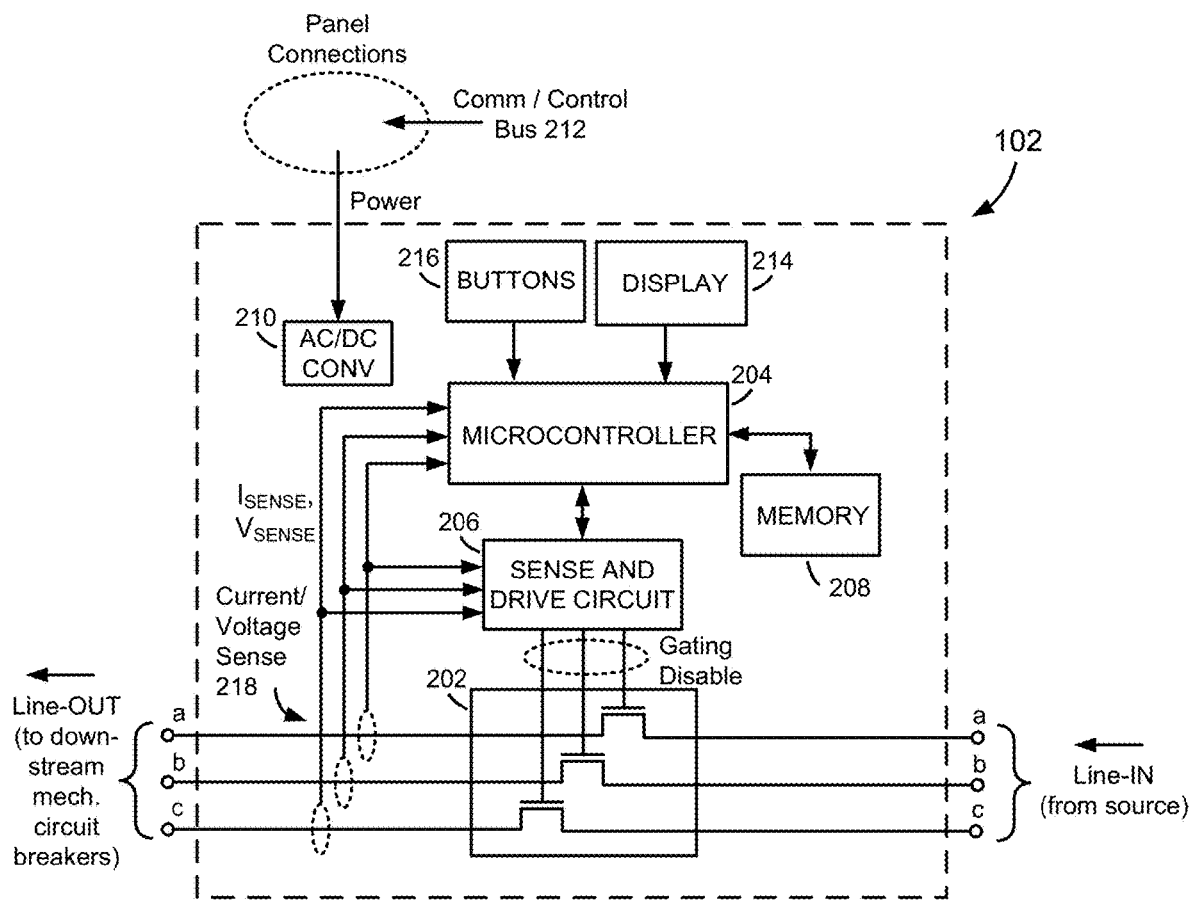
FIG. 2 is a drawing showing the salient components of the SSCB configured in the electrical distribution system depicted in FIG. 1, according to one embodiment of the present invention.
Figure 3:
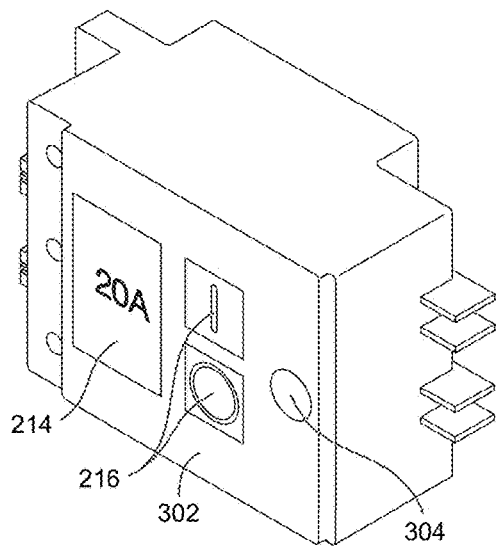
FIG. 3 is a drawing illustrating how the SSCB depicted in FIG. 2 is housed within an enclosure (i.e., housing), in accordance with one embodiment of the present invention.

FIG. 2 is a drawing showing the salient components of the SSCB 102. The SSCB 102 comprises a solid-state switching device 202, a microcontroller (or microprocessor) 204, and computer-readable memory 208. Preferably, and as illustrated in FIG. 3, the SSCB 102 is housed within an enclosure (i.e., "housing") 302 with cut-outs formed through the front face of the enclosure for an electronic display 214 and ON/OFF buttons 216 that can be pressed by a person to direct the microcontroller 204 to switch the solid-state switching device 202 ON and OFF. In one embodiment of the invention the SSCB 102 includes an air-gap disconnect unit connected in series with the solid-state switching device 202, in which case the housing SSCB housing 302 further includes a cut-out for a RESET button 304, which can be depressed to reset the air-gap disconnect unit after a fault has been cleared. Further details of an exemplary air-gap disconnect unit that may be used in that embodiment of the invention may be found in co-pending and commonly assigned U.S. patent application Ser. No. 15/443,736, entitled "Hybrid Air-Gap Solid-State Circuit Breaker" and U.S. patent application Ser. No. 15/076,304, entitled "Dynamic Coordination of Protection Devices in Electrical Distribution Systems," both of which are both incorporated by reference to the extent they do not conflict with this disclosure.

The SSCB 102 may also house an AC/DC converter 210 that converts AC power from an AC power source (e.g., as supplied from within the distribution board (i.e., "panel")) to DC power for powering the microcontroller 204 and other components in the SSCB 102. Alternatively, a separate and dedicated DC power supply that supplies DC power independent of AC line power may be used.

Figure 4:
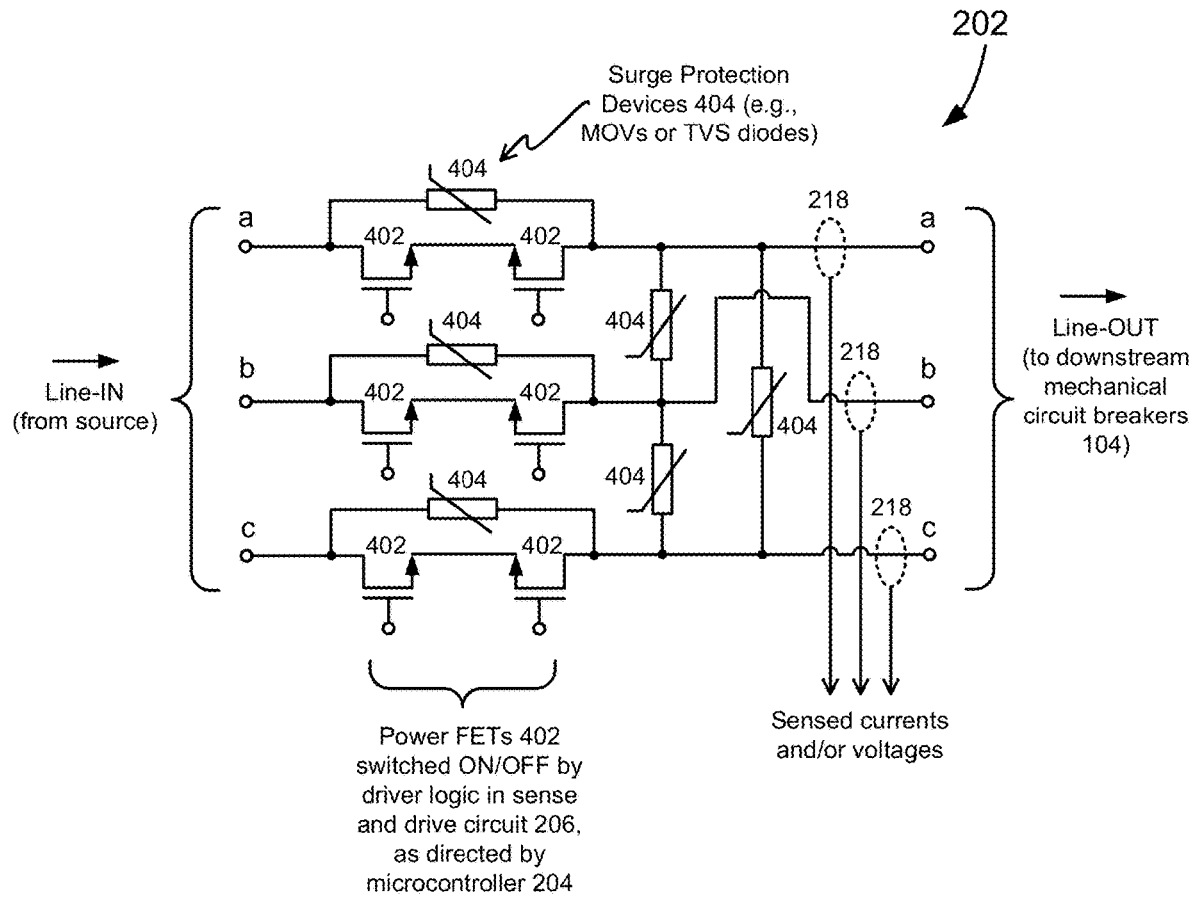
FIG. 4 is a drawing illustrating one way the solid-state switching device in the SSCB depicted in FIG. 2 is constructed, in accordance with one embodiment of the present invention.

The solid-state switching device 202 of the SSCB 102 can be implemented in various ways and using different types of semiconductor devices. FIG. 4 is a drawing illustrating how the solid-state switching device is constructed, in one embodiment of the invention. Each phase includes a pair of back-to-back field effect transistors (FETs) 402, which provides the SSCB 102 the ability to facilitate soft starting of inductive motor loads, as explained in aforementioned co-pending and commonly assigned U.S. patent application Ser. No. 15/443,736, entitled "Hybrid Air-Gap Solid-State Circuit Breaker" and U.S. patent application Ser. No. 15/076, 304. In another embodiment of the invention, a single bi-directional FET is used in each phase, as illustrated in FIG. 2. The exemplary solid-state switching device 202 further includes surge protection devices 404, which as will be explained in further detail below suppress voltage surges generated upon occurrences of short circuits and voltage spikes generated by a "current pulsing" technique applied during selective coordination of the SSCB 102 among the plurality of downstream mechanical CBs 104. In one embodiment of the invention the surge protection devices 404 comprise metal-oxide varistors (MOVs). In another embodiment, they comprise transient-voltage-suppression (TVS) diodes.

In general, the microcontroller 204 is responsible for directing and controlling the ON/OFF statuses of the power FETs 402 in the solid-state switching device 202, in particular during the selective coordination of the SSCB 102 among the plurality of downstream mechanical CBs 104 during short circuit events. It may also be programmed to perform other functions. For example, it may be configured to control other SSCBs configured in the electrical distribution system and/or may be configured to be controlled by other SSCBs or by a local or remotely located host computer, via a communications and control (comm/control) bus 212 (e.g., an inter-IC (I2C) or controller area network (CAN) bus), such as described in aforementioned, co-pending and commonly assigned U.S. patent application Ser. Nos. 15/443,736 and 15/076,304, and co-pending and commonly assigned U.S. patent application Ser. No. 15/723,358, entitled "Solid-State Circuit Interrupter and Arc Inhibitor," which is also incorporated by reference to the extent it does not conflict with this disclosure.

The sense and drive circuit 206 includes driver logic for driving semiconductor devices in the solid-state switching device 202 and operates in cooperation with the microcontroller 204 to react to line current and/or line voltage information measured or sensed by current/voltage sensors 218 and to "pulse" the voltage thereby controlling the current flowing through the power FETs 402 in the solid-state switching device 202 during short-circuit events when the SSCB 102 is being selectively coordinated, as will be described in more detail below. Note that in the exemplary selective coordination technique described below, it is assumed that the SSCB 102 is the sole (i.e., "main") SSCB in the electrical distribution system and that selective coordination is performed for that sole SSCB and the plurality of downstream mechanical CBs 104 (such as depicted in FIG. 1). It should be emphasized, however, that the selective coordination technique can also be applied in electrical distribution systems that include a plurality of SSCBs, for example a main SSCB and a mixed plurality of downstream mechanical CBs and other SSCBs.

The memory 208 in the SSCB 102 is tangible, computer-readable memory. Depending on the particular type of microcontroller being used, it may be embedded in the microcontroller 204, external to the microcontroller, or partly embedded in the microcontroller 204 and partly external to the microcontroller 204. The memory 208 also preferably includes a combination of non-volatile memory (e.g., read-only memory (ROM) and/or programmable ROM such as electrically erasable programmable ROM (EEPROM) memory and/or Flash memory) and volatile memory (e.g., random-access memory RAM)). The non-volatile memory is configured to store firmware that directs and controls the operation of the microcontroller 204, including time and current parameters used in selectively coordinating the SSCB 102 among one or more downstream mechanical CBs. The microcontroller 204 uses the volatile memory for processing and as temporary storage for data and other digital information during execution of the computer program instructions specified by the firmware.

Figure 5:
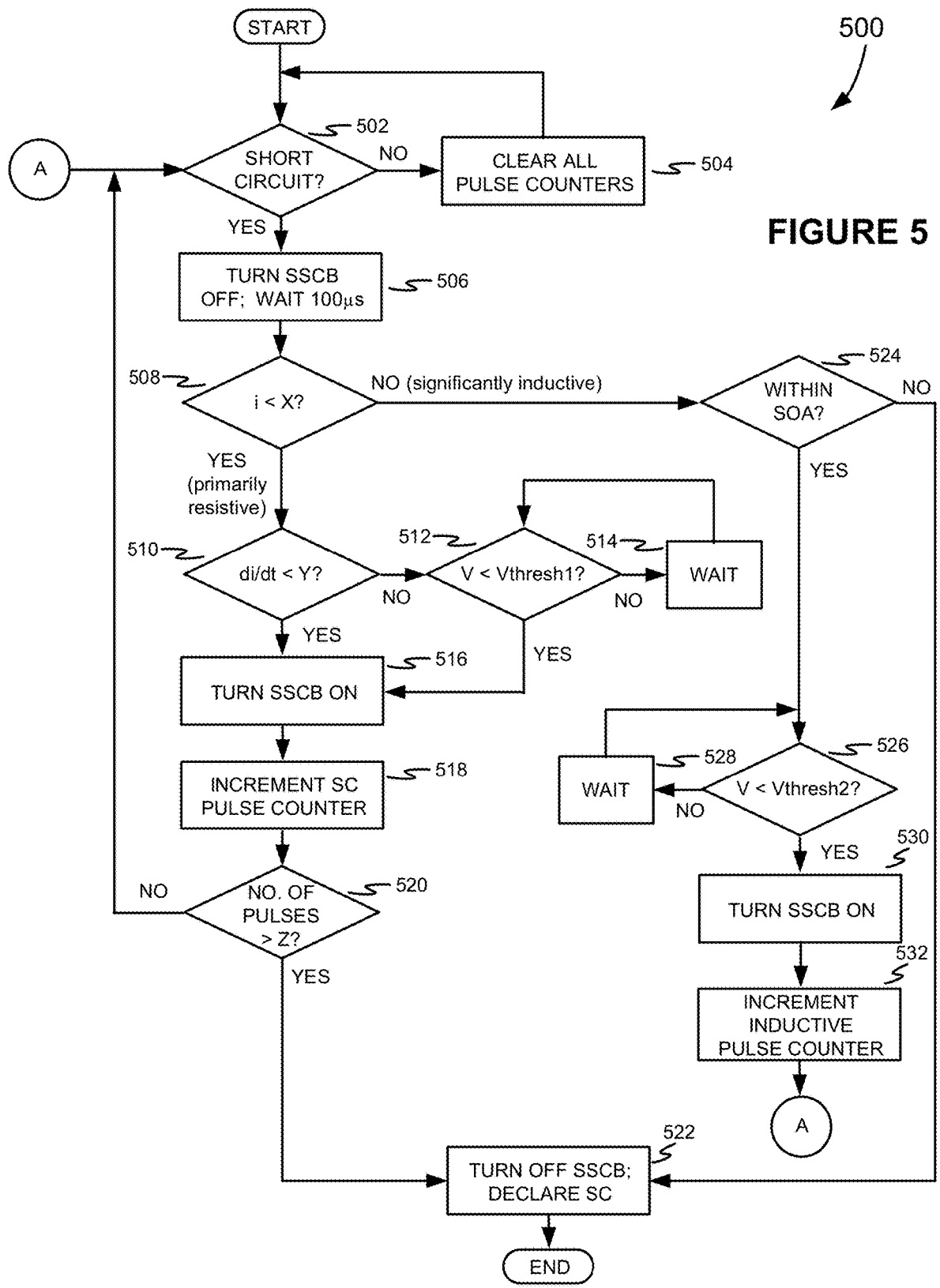
FIG. 5 is a flowchart of an exemplary method of selectively coordinating the SSCB depicted in FIG. 3 among one or more downstream mechanical CBs in an electrical distribution system, according to one embodiment of the present invention.

Among the instructions specified by the firmware are instructions that direct and control how the microcontroller 204 conducts and performs the selective coordination of the SSCB 102 among one or more downstream mechanical CBs 104. FIG. 5 is a flowchart illustrating the various steps and decisions performed by the microcontroller 204 during the selective coordination process 500. (Note that the selective coordination process 500 differs from the conventional approach to selective coordination in that selective coordination is performed in real time, automatically, and without the need for human assistance. In the conventional approach to selective coordination, an engineer performs a selective coordination study and then implements the results of the study in the design of the electrical distribution system. After the electrical distribution system has been constructed, no further coordination is possible, except for replacing one mechanical CB with another mechanical CB (perhaps of a different type or rating) or, if the mechanical CBs allow, by making some manual but limited adjustment to the time-current characteristics of one or more of the mechanical CBs.

Before describing the details of each step in the selective coordination method 500, it should be emphasized that the various steps and decisions depicted in the flowchart are not necessarily performed in the order shown. Additionally, some of the operations may actually be performed continuously or simultaneously, rather than as a timed sequence of events. Finally, it should be mentioned that, although the selective coordination method 500 is described in the context of a short circuit, the same or similar technique can be adapted and used when responding to other types of abnormal overcurrent conditions, for example, overloads that do not rise to a level of a short circuit but which also do not require the SSCB 102 to shut off permanently or prematurely in order to isolate the anomaly.

Initially, i.e., prior to the "start" of the selective coordination method 500, it is assumed that there are no faults present in the electrical distribution system and that the SSCB 102 and all downstream mechanical CBs 104 are operating normally. At decision 502, the first step in the selective coordination method 500, the microcontroller 204 determines, based on line currents sensed by current/voltage sensors 218 (see FIG. 2), whether a short circuit is present anywhere downstream from the SSCB 102. If no short circuit condition is detected ("NO" at decision 502), at step 504 the microcontroller 204 clears all pulse counters (the relevance of which will become more clear from the description below) and the method returns to decision 502. If, on the other hand, a short circuit is detected at decision 502 ("YES" at decision 502), at step 506 the microcontroller 204 directs (e.g., by triggering an interrupt) the driver logic in the sense and drive circuit 206 to temporarily switch OFF the solid-state switching device 202, i.e., for a brief moment (100 μs in this exemplary embodiment).

Before continuing with the description of the selective coordination method 500 depicted in FIG. 5, it should be pointed out that the surge protection devices 404 in the solid-state switching device 202 (see FIG. 4) serve to suppress voltage surges that occur every time the FETs 402 in the solid-state switching device 202 are switched OFF at decision 506. They also serve to dissipate large inductive kickback currents that flow in the system in circumstances where the overall system impedance during a short circuit event is significantly inductive. It is not always known beforehand whether the overall system impedance during a short circuit will be primarily resistive or have a significant inductive component. However, the ability to make that determination during a short circuit condition would be beneficial since it can help protect the surge protection devices 404 from being irreversibly damaged due to operating outside their safe operating areas (SOA), as will become discussed in more detail below.

In accordance with one embodiment of the invention, a determination of whether the overall system impedance during a short circuit is primarily resistive or has a significant inductive component is made at decision 508 in the selective coordination method 500. This determination is made by the microcontroller 204 based on measurements taken by the current/voltage sensors 218 (see FIGS. 2 and 4 above) after the SSCB 102 has been switched OFF temporarily at step 506. After the SSCB 102 is switched OFF at step 506, the short circuit current that was flowing just prior decays and dissipates through one or more of the surge protection devices 404. As the current decays, the current sensors 218 monitor the magnitudes of the line currents. If the line currents decay rapidly and to a magnitude less than some predetermined current "X" at the time decision 508 is performed, the microcontroller 204 is able to conclude, based on the measurements taken by the current/voltage sensors 218, that the overall system impedance is primarily resistive ("YES" at decision 508). On the other hand, if the current measurements reveal that the current is decaying and dissipating slowly and the measured current still remains greater than "X" at the time decision 508 is performed, the microcontroller 204 is able to conclude, based on the measurements taken by the current/voltage sensors 218, that the overall system impedance is significantly inductive ("NO" at decision 508). Note that the current/voltage sensors 218 are placed on the Line-OUT side of the solid-state switching device 202, downstream from the line-to-line surge protection devices 404, as shown in FIG. 4, so that the line currents can still be measured after the FETs 402 in the solid-state switching device 202 have been temporarily switched OFF at step 506. (If the current/voltage sensors 218 were placed on the Line-IN side, the line currents could not be measured after the FETs 402 are switched OFF at step 506.)

Assuming that the microcontroller 204 has determined at decision 508 that the overall system impedance is primarily resistive ("YES" at decision 508), at decision 510 the microcontroller 204 (by itself or with the assistance of the sense and drive circuit 206) checks whether the rate of change of current di/dt is less than some predetermined level "Y." This decision 510 is performed since, even though the microcontroller 204 determined at decision 508 that the overall system impedance is primarily resistive, the possibility of some limited inductive component might nevertheless be present. Decision 510 addresses this unknown and is performed as a safeguard before the SSCB 102 is switched back ON (briefly) in next step 516. In this way if there is some limited inductive component in the overall system impedance at decision 510, an unacceptably large current spike can be avoided when the SSCB 102 is switched back ON (briefly) at next step 516.

If at decision 510 the microcontroller 204 determines that it is safe to switch the power FETs 402 in the solid-state switching device 202 back ON, at step 516 it does so by directing the sense and drive circuit 206 to generate and apply drive signals to the power FETs 402 in the solid-state switching device 202 to switch the power FETs 402 ON temporarily. Then at step 518, the microcontroller increments its short circuit (SC) pulse counter to record the fact that a current pulse has been generated and passed downstream to other portions of the electrical distribution system.

Figure 6:
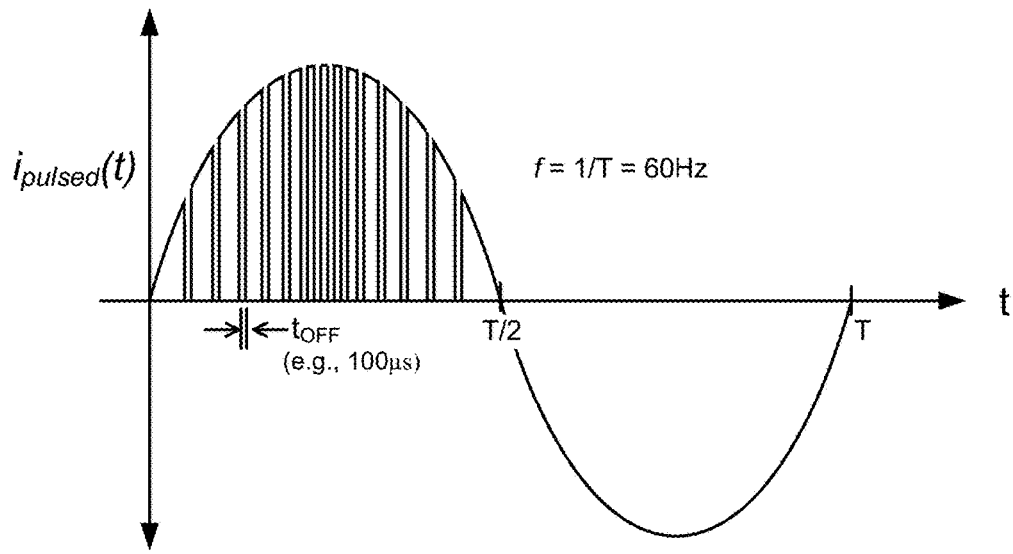
FIG. 6 is a signal drawing illustrating how a short circuit current flowing through the SSCB and downstream to one or more downstream mechanical CBs is pulsed during the selective coordination method depicted in FIG. 5.

As the selective coordination method 500 is performed and the method loops again and again through steps 502-520, the short circuit current is "pulsed," as illustrated in FIG. 6. As will be explained in further detail below, the microcontroller 204 controls the pulse widths so that the root-mean-square (RMS) value of the pulsed short circuit current $i_{pulsed}$ in each phase of the distribution system is forced to remain less than some predefined upper current limit $i_{up}$ and greater than some predefined lower current limit $i_{low}$. In one embodiment of the invention, the upper current limit $i_{up}$ is set based on the current rating of the SSCB 102, for example, some multiple (e.g., ×3 or ×5) of the SSCB's current rating, but not so high as to damage the solid-state switching device 202 or cause the SSCB 102 to trip unnecessarily or prematurely during the selective coordination process 500, and the lower current limit $i_{low}$ is set so that during the selective coordination process 500 the RMS value of the pulsed short circuit current $i_{pulsed}$ remains high enough to allow one of the downstream mechanical CBs 104 to naturally trip according to its time-current characteristic curves (preferably, the mechanical CB nearest the short circuit). If there is more than one downstream mechanical CB, the lower limit may be set based on the time-current characteristics of the slowest downstream mechanical CB (i.e., the mechanical CB having time-current characteristics closest to the time-current characteristics of the SSCB 102 when plotted on a time-current characteristics log-log plot). For example, if the time-current characteristics of the slowest downstream mechanical CB indicate that the mechanical CB should trip in no more than 10 ms when passing an RMS current of 300A, the lower current limit $i_{low}$ can be set to around 300A. During a short circuit, current pulsing can then be performed for a little over 10 ms, while limiting the RMS value of the pulsed short circuit current $i_{pulsed}$ to between the high upper limit $i_{up}$ set based on the current rating of the SSCB 102 and the lower current limit $i_{low}$, = 300A.

Figure 7:
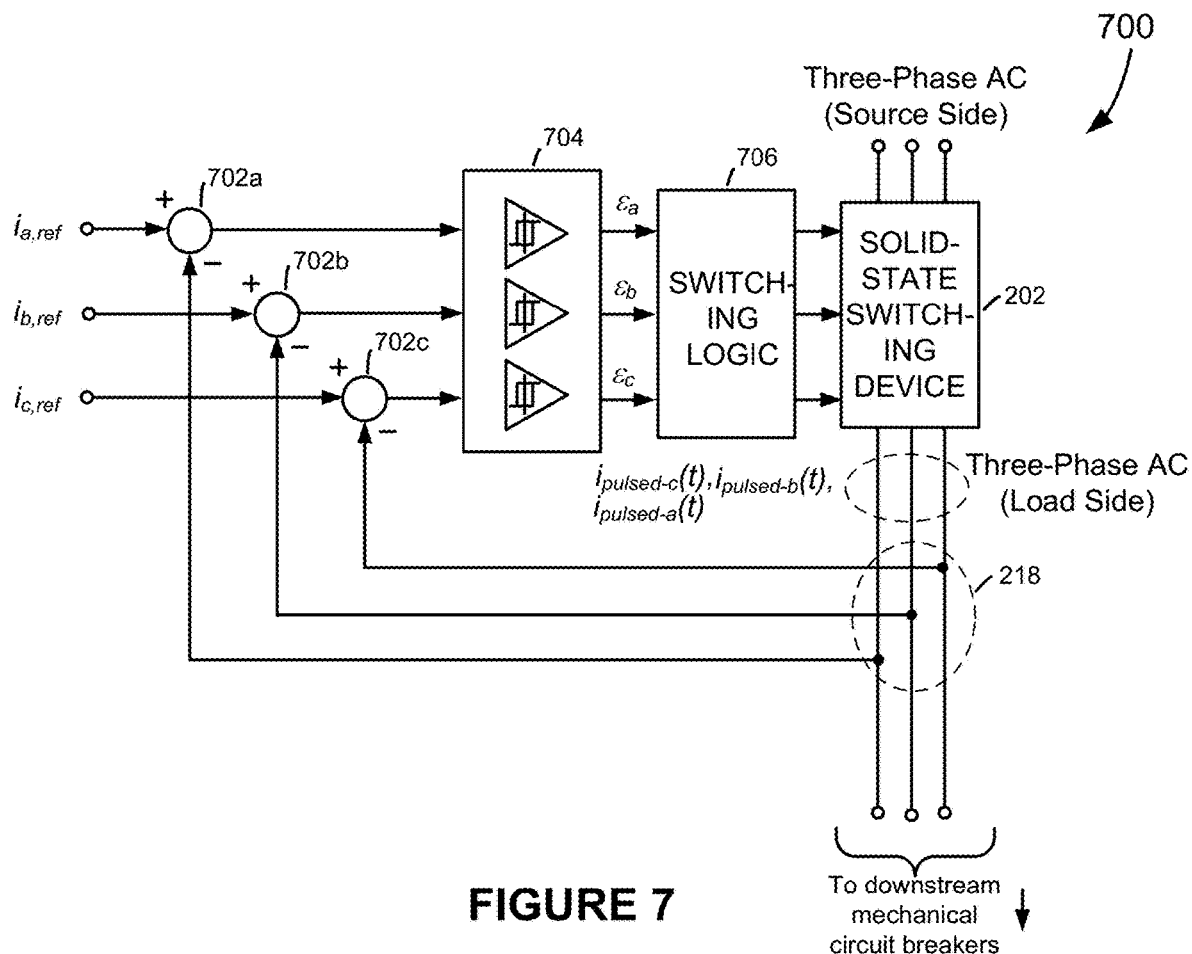
FIG. 7 is functional block diagram illustrating an exemplary hysteresis control loop employed in the selective coordination method depicted in FIG. 5, according to one embodiment of the present invention.

According to one embodiment of the invention the RMS value of the pulsed short circuit current $i_{pulsed-a}(t)$ (and RMS values of the pulsed short circuit currents $i_{pulsed-b}(t)$ and $i_{pulsed-c}(t)$) in the other two phases of the three-phase distribution system are forced to be maintained within upper and lower current limits $i_{up}$ and $i_{low}$ using a form of hysteresis control, such as illustrated in FIG. 7. The pulsed short circuit currents $i_{pulsed-a}(t)$, $i_{pulsed-b}(t)$ and $i_{pulsed-c}(t)$ are sensed or measured at the load side of the solid-state switching device 202, using current/voltage sensors 218 in the SSCB 202, and fed back to summers 702a, 702b and 702c, which subtract the fed back sensed currents $i_{sensed-a}(t)$, $i_{sensed-b}(t)$ and $i_{sensed-c}(t)$ from reference currents $i_{a,ref}$, $i_{b,ref}$ and $i_{c,ref}$ to produce error signals $\varepsilon_a$, $\varepsilon_b$ and $\varepsilon_c$. Depending on the values of the error signals $\varepsilon_a$, $\varepsilon_b$ and $\varepsilon_c$, hysteresis comparators 704 then direct switching logic 706 to either increase or decrease the pulse widths of the drive signals applied to the gates of the power FETs 402 in the solid-state switching device 202. The RMS values of the pulsed short circuit currents $i_{pulsed-a}(t)$, $i_{pulsed-b}(t)$ and $i_{pulsed-c}(t)$ are thus modified due to the increased/decreased pulse widths. The pulse-width-modified pulsed short circuit currents $i_{pulsed-a}(t)$, $i_{pulsed-b}(t)$ and $i_{pulsed-c}(t)$ are then sensed once again by the current/voltage sensors 218 and fed back to summers 702a, 702b and 702c to produce new error signals $\varepsilon_a$, $\varepsilon_b$ and $\varepsilon_c$. The hysteresis comparators 704 then direct the switching logic 706 to once again increase or decrease the pulse widths of the FET drive signals based on new error signals $\varepsilon_a$, $\varepsilon_b$ and $\varepsilon_c$. This feedback and control process is performed continuously in a constant effort to minimize the error signals $\varepsilon_a$, $\varepsilon_b$ and $\varepsilon_c$. In this manner the RMS values of the pulsed short circuit currents $i_{pulsed-a}(t)$, $i_{pulsed-b}(t)$ and $i_{pulsed-c}(t)$ are forced to be maintained within their respective upper and lower current limits $i_{up}$ and $i_{low}$.

It should be mentioned that the various components of the hysteresis current control loop depicted in FIG. 7, including the summers 702a, 702b and 702c, hysteresis comparators 702, and switching logic 704 may be implemented entirely in hardware but are more preferably implemented using a combination of software and hardware. In the latter embodiment, the software would comprise part of the firmware stored in the non-volatile portion of the memory 208. The remaining hardware needed to complete the implementation of the hysteresis control may comprise hardware resources provided entirely by the microcontroller 204 or may further comprise hardware resources external to the microcontroller 204, such as for example a field programmable gate array (FPGA) or an application specific integrated circuit (ASIC).

Figure 8:
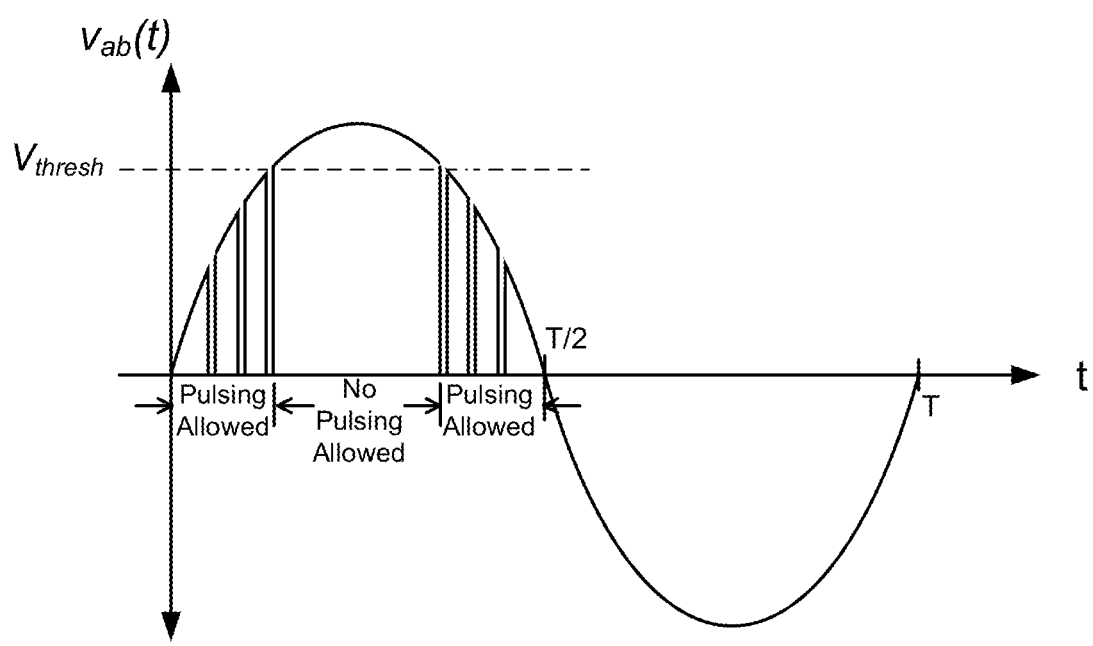
FIG. 8 is a drawing illustrating how "current pulsing" employed in the selective coordination method depicted in FIG. 5 is restricted to times during each cycle when the magnitude of the line voltage is below some predetermined voltage threshold $V_{thresh}$, in accordance with one embodiment of the present invention.

Referring back to decision 510 in the selective coordination method 500 (see FIG. 5), if the microcontroller 204 determines that the time rate of change in current (di dt) is greater than the predetermined current rate "Y" ("NO" at decision 510), the microcontroller waits for the line voltages $v_{ab}$, $v_{bc}$ and $v_{ac}$ to be less than some predetermined voltage threshold $V_{thresh1}$. The significance of this decision 510 relates to the waveforms of the pulsed line currents $i_{pulsed-a}(t)$, $i_{pulsed-b}(t)$ and $i_{pulsed-c}(t)$ produced by application of the hysteresis current control method described above. Application of the hysteresis control method results in pulsed current (and voltage) waveforms having pulses that vary in width (duration) depending on when in each cycle they occur. As can be seen in FIG. 6, the widths of the current pulses in each phase are narrower (shorter duration) during times in each cycle when the line current and associated line voltage are near their peaks and broader (longer duration) during times in each cycle when the line current and associated line voltage are at lower magnitudes. The narrow current pulses are undesirable since they result in high frequency operation in the hysteresis control loop and because the power FETs 402 in the solid-state switching device 202 may not be capable of reacting to corresponding narrow drive voltage pulses. The fact that the narrow current pulses occur during times in each cycle when the line voltage $v_{ab}$, $v_{bc}$ and $v_{ac}$ are at or near their peaks is also problematic since the combined high voltage and high current results in excess power dissipation and because the combined high current/high voltage during those times can stress and potentially damage the power FETs 402. To avoid these problems, in one embodiment of the invention current pulsing in the selective coordination method 500 is restricted to times when the magnitudes of the line voltages $v_{ab}$, $v_{bc}$ and $v_{ac}$ are less than some predetermined voltage threshold $V_{thresh1}$, as illustrated in FIG. 8. Accordingly, if at decision 512 the microcontroller 204 determines that the magnitudes of the line voltages $v_{ab}$, $v_{bc}$ and $v_{ac}$ at that time are greater than the predetermined voltage threshold $V_{thresh1}$, the microcontroller 204 waits at step 514 until the line voltage drops to a value less than the voltage threshold $V_{thresh1}$. Restricting current pulsing to only times when the line voltages $v_{ab}$, $v_{bc}$ and $v_{ac}$ are less than the voltage threshold $V_{thresh1}$ further affects (reduces) the RMS values of the pulsed line currents $i_{pulsed-a}(t)$, $i_{pulsed-b}(t)$ and $i_{pulsed-c}(t)$. Accordingly, imposing the voltage threshold $V_{thresh1}$ can be viewed as a second way by which the magnitudes of the line currents are limited during the selective coordination method 500 (the other being by controlling the pulsed current pulse widths).

After the microcontroller 204 has determined at decision 512 that the line voltage has dropped to a value less than the voltage threshold $V_{thresh1}$, it directs the driver logic in the sense and drive circuit 206 to switch the SSCB 102 back ON (briefly) at step 516. The microcontroller 204 then increments its SC pulse counter at step 518 to record the fact that a current pulse has been generated and passed downstream to other portions of the electrical distribution system. At decision 520, the microcontroller 204 queries as to whether the number of DC pulses counted so far is greater than a maximum permissible pulse count Z (where "Z" represent some positive integer). A "YES" at decision 520 is an indication that not any one of the downstream CBs, even the slowest CB, was able to trip and isolate the short circuit. When that condition occurs, at step 522 the microcontroller 204 directs the driver logic in the sense and drive circuit 206 to switch the power FETs 402 in the solid-state switching device 202 OFF. Otherwise ("NO" at decision 520), the method 500 returns to decision 502 and the microcontroller 204 repeats steps 502-520 to pulse the short-circuit current once again according to the hysteresis control method described above. As steps 502-520 are repeated the microcontroller 204 also monitors the load-side line voltages and/or current to determine whether the one of the downstream mechanical CBs 104 has been able to isolate the short circuit. If one of the downstream mechanical CBs 104 does in fact trip and isolate the short circuit (as indicated by a "NO" at decision 502), the microcontroller 204 clears its pulse counters at step 504 and enters a standby state during which it monitors the system for any possible subsequent short circuit event. On the other hand, if it is determined at decision 520 that none of the downstream mechanical CBs 104 was able to isolate the short circuit after the predetermined maximum number of current pulses Z (as reflected in the microcontroller's 204's SC pulse counter), at step 522 the microcontroller 204 directs the driver logic in the sense and drive circuit 206 to switch the power FETs 402 in the solid-state switching device 202 OFF permanently, until an engineer or electrician can be dispatched to investigate and correct the problem (e.g., by replacing a defective mechanical CB that should have, but for some reason was unable to, isolate the short circuit).

As explained above, decision 508 in the selective coordination method 500 is performed to determine whether the overall system impedance is primarily resistive ("YES" at decision 508) or significantly inductive ("NO" at decision 508). If the microcontroller 204 determines that the overall system impedance is significantly inductive, steps 524-532 are performed instead of steps 510-520. The reason for different steps 524-532 follows from the fact that when a significant inductive component is involved, a short-circuit condition will have an inductive current component that needs to be dissipated in one or more surge protection devices 404 in the solid-state switching device 202. Large voltage spikes v=L×di/dt are produced every time the power FETs 402 are pulsed in the performance of the hysteresis control method. Although the surge protection devices 404 in the solid-state switching device 202 (see FIG. 4 above) serve to suppress the voltage surges and spikes, their effectiveness can degrade if exposed to an inordinate number of voltage spikes. To prevent irreversible damage to the surge protection devices 404, decision 524 is therefore performed. Decision 524 queries whether the surge protection devices 404 are operating within their SOA, which in one embodiment of the invention is defined and set based on some predefined maximum number of times (counts) that a current pulse is allowed to be generated in the method 500. Each time a current pulse is generated at step 530, the microcontroller 204 increments an internal "inductive pulse counter." Accordingly, if at decision 524 the microcontroller 204 determines that the number of counts recorded in the inductive pulse counter has exceeded the maximum allowable count defining the SOA of the protection devices ("NO" at decision 524), at step 522 the SSCB 202 is switched OFF permanently until an engineer or electrician can be dispatched to investigate and correct the problem. Otherwise, steps 526 and 528 are performed prior to pulsing the current back ON at step 530.

As was explained above in reference to FIG. 6, narrow current pulses generated in the selective coordination method 500 are undesirable since they result in high frequency operation of the hysteresis control loop and because they occur during times when the line voltages are at or near their peaks, resulting in a combined high voltage/high current that can result in excess power dissipation and stress to the power FETs 402 in the solid-state switching device 202. To avoid these problems, decision 526 and associated step 528 are performed, similar to decision 512 and associated step 514. Similar to at decision 512, at decision 526 the microcontroller 204 queries whether the magnitude of the line voltage is greater than some predetermined voltage threshold $V_{thresh2}$, and similar to step 514 the microcontroller 204 waits in step 528 until the line voltage drops to a value less than some predetermined voltage threshold $V_{thresh2}$, before directing the driver logic in the sense and drive circuit 206 to switch the power FETs 402 in the solid-state switching device 202 back ON (briefly) at step 530. After the SSCB 102 is switched back ON, the microcontroller 204 increments its inductive pulse counter and the method 500 returns to decision 502. Steps 502, 508 and 524-532 are then repeated once again, pulsing the short-circuit current according to the hysteresis control method described above. As the various steps are repeated, the microcontroller 204 continuously monitors the load-side line voltages and/or current to determine whether the one of the downstream mechanical CBs 104 has been able to isolate the short circuit. If one of the downstream mechanical CBs 104 does in fact trip and isolate the short circuit ("NO" at decision 502), the microcontroller 204 clears its SC and inductive pulse counters at step 504 and enters a standby state during which it monitors the system for any possible subsequent short circuit event. On the other hand, if none of the downstream mechanical CBs 104 is able to isolate the short circuit after the predetermined maximum number of current pulses (as reflected in the microcontroller's 204's inductive pulse counter and determined at decision 524), at step 522 the microcontroller 204 directs the driver logic in the sense and drive circuit 206 to switch the power FETs 402 in the solid-state switching device 202 OFF permanently, until an engineer or electrician can be dispatched to investigate and correct the problem.

Figure 9:
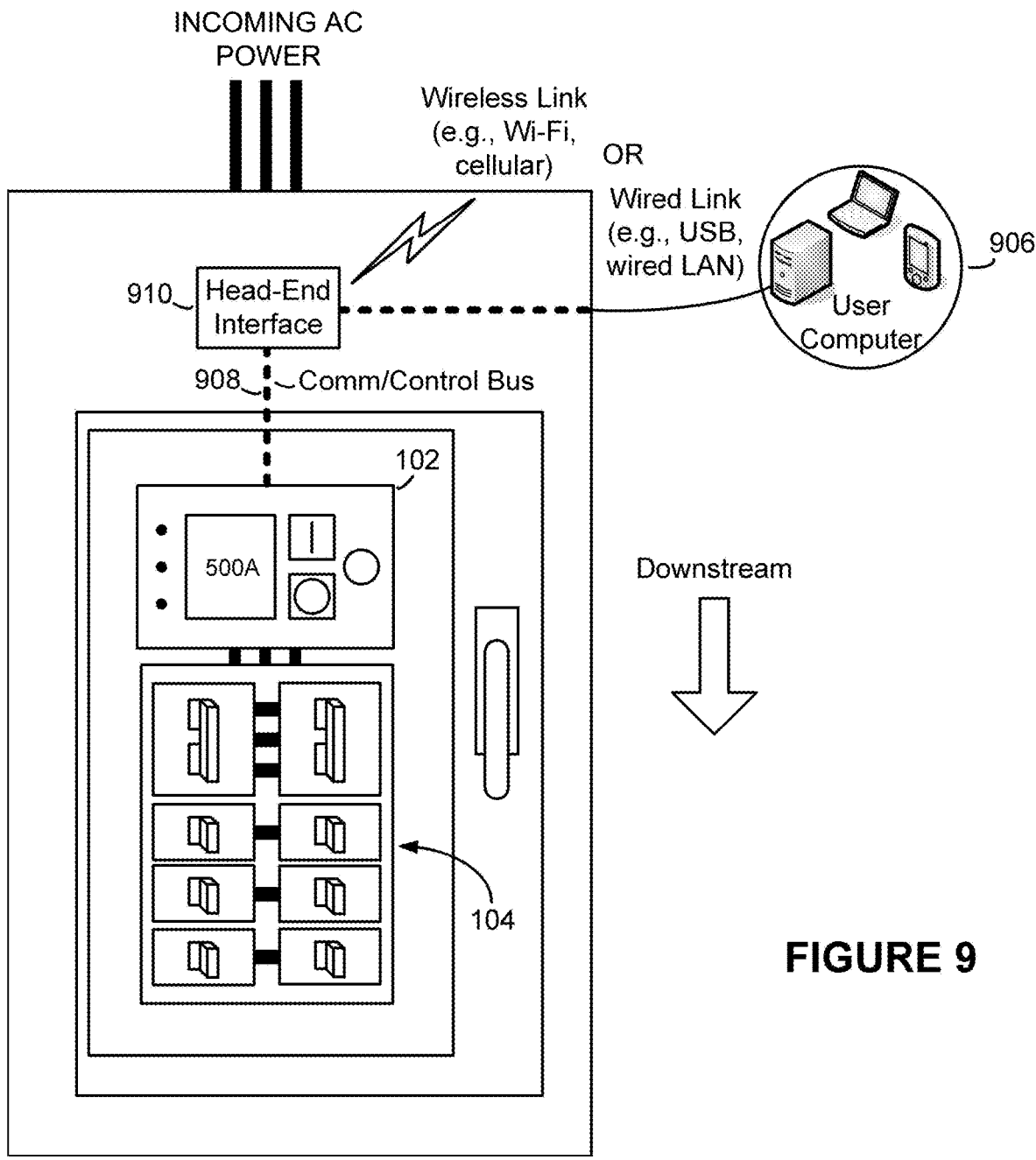
FIG. 9 is a drawing illustrating how the SSCB in the electrical distribution system depicted in FIG. 2 can be adapted to communicate with and be controlled by a user computer, according to one embodiment of the invention.
Figure 10:
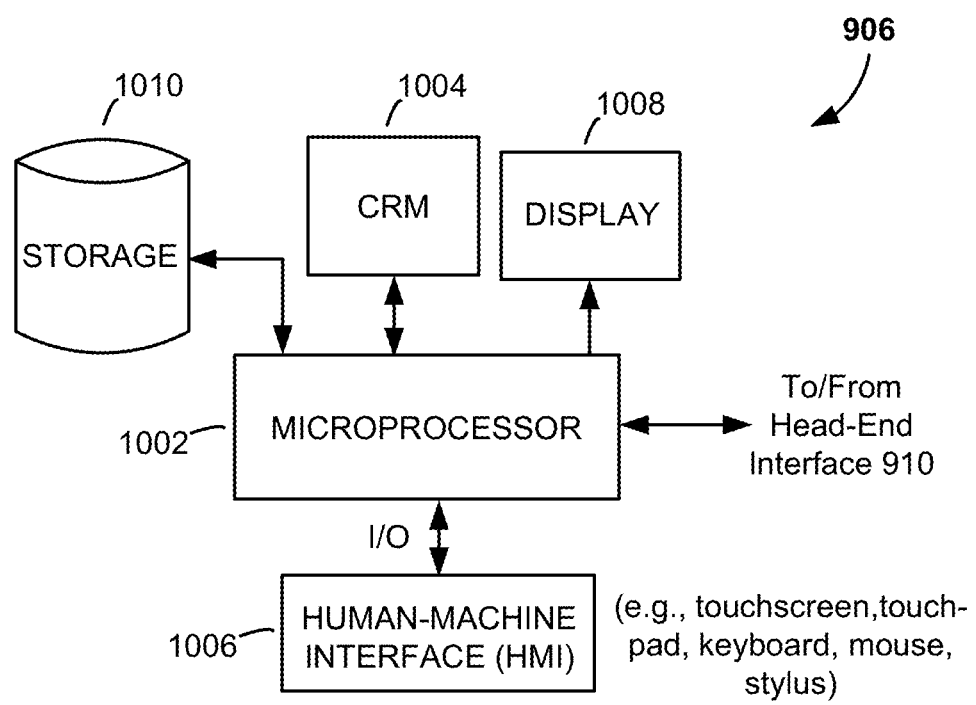
FIG. 10 is a drawing showing the salient elements of the user computer depicted in FIG. 9.

During the selective coordination method 500, the hysteresis control loop (see FIG. 7) regulates the RMS value of the pulsed short circuit current $i_{pulsed}$ between the upper and lower RMS current limits $i_{up}$ and $i_{low}$, to produce what may be referred to as an 'effective' RMS pulsed short circuit current $i_{pulsed,eff}$. In the exemplary embodiments of the invention described above, the effective pulsed short circuit current $i_{pulsed,eff}$ is fixed to some default value. The maximum SC pulse count "Z" loaded into the SC pulse counter (which determines how long pulsing is allowed to persist before tripping the SSCB 102) is also set to some fixed or default value. In another embodiment of the invention, the SSCB 102 is programmed so that these parameters can be set and adjusted, directly or indirectly, by a person (i.e., a "user"). By providing this flexibility, the SSCB 102 can then be coordinated among a wider variety of downstream CBs. To facilitate this embodiment of the invention, a user computer 906 (desktop, laptop, tablet, smartphone, or other computing device) is configured to communicate with the SSCB's microcontroller 204 via a communications and control (comm/control) bus 908 and head-end interface 910, as illustrated in FIG. 9. The salient elements of the user computer 906 are shown in FIG. 10 and include: a microprocessor 1002; a computer readable memory (CRM) 1004; a human-machine interface (HMI) 1006; a display 1008; and an optional mass storage device 1010 (e.g., a magnetic hard drive or a solid-state drive). The CRM 1004 is configured to store computer program instructions which direct the operation of the microprocessor 1002, including instructions that direct how and when the microprocessor 1002 communicates with the SSCB's 102's microcontroller 204 over the comm/control bus 908; instructions for generating and displaying user-interactive icons, menus, etc. on the user computer's display 1008; and instructions for handling directions, commands and input from the user via the HMI 1006, including directions, commands and input that affect the effective pulsed short circuit current $i_{pulsed,eff}$ and maximum SC pulse count Z, both which comprise part of the firmware stored in the nonvolatile memory of the SSCB 102. The HMI 1006 may be integrated with the display 1008 and equipped with touchscreen technology, to form a user-interactive graphical user interface (GUI), which the user can manipulate using a finger or stylus, specifically, by touching the screen of the display 1008 to manipulate GUI icons and/or widgets, such as radio buttons, sliders, spinners, drop-down lists, menus, combo and text boxes, scrollbars, etc., using a finger or stylus to enter directions, commands and input that affect, among other things, the effective pulsed short circuit current $i_{pulsed,eff}$ and maximum SC pulse count Z used in the selective coordination method 500. Alternatively (or additionally), the HMI 1006 may include a mouse, touchpad, or other non-touchscreen input device that the user can manipulate to enter directions, commands and input that alter the SSCB's 102's firmware and time and current parameter used in the selective coordination method 500.

Figure 11:
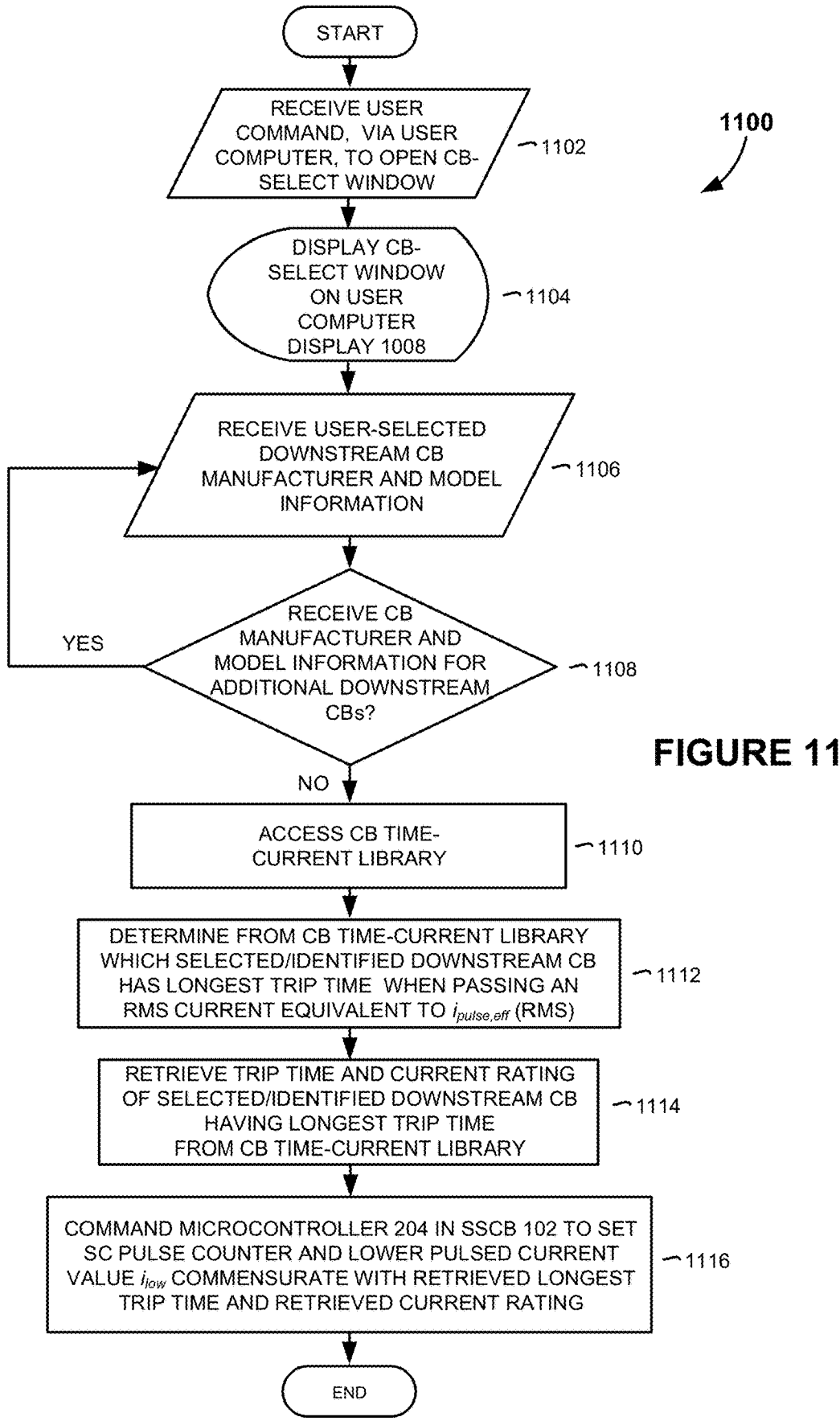
FIG. 11 is a flowchart illustrating an exemplary method the user computer depicted in FIGS. 9 and 10 performs in response to a user's interaction with the user computer, to modify the firmware in the nonvolatile memory of the SSCB, in particular, the effective pulsed short circuit current $i_{pulsed,eff}$ and maximum SC pulse count Z used in the selective coordination method depicted in FIG. 5.
Figure 12:
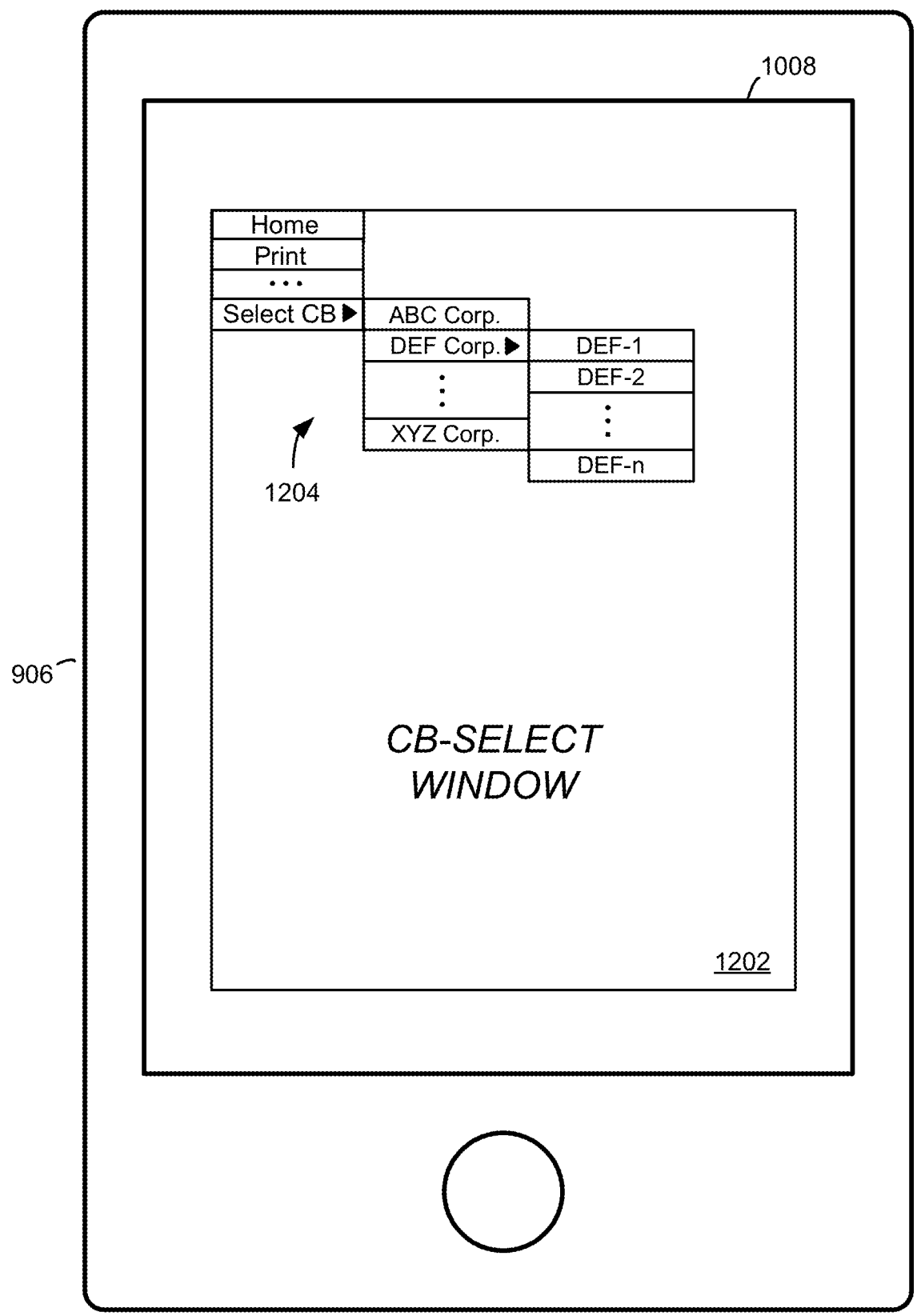
FIG. 12 is a drawing showing an exemplary CB-select window the user computer depicted in FIGS. 9 and 10 generates and displays on the user computer's display and a user manipulates to affect the max pulsing time and RMS value of the pulsed short circuit current $i_{pulsed}$ used in the selective coordination method depicted in FIG. 5, in accordance with one embodiment of the present invention.

FIG. 11 is a flowchart illustrating an exemplary method 1100 the user computer 906 performs in response to a user's interaction with the user computer 906, specifically, to modify the firmware in the nonvolatile memory of the SSCB 102, in particular, the effective pulsed short circuit current $i_{pulsed,eff}$ and maximum SC pulse count Z used in the selective coordination method 500. First, at step 1102, the user computer 906 receives a command from the user, via the HMI 1006, to open and display a 'CB-select window' on the user computer's display 1008. In one embodiment of the invention, illustrated in FIG. 12, the CB-select window 1202 includes a user-interactive dropdown menu system 1204 that the user manipulates to identify and select the manufacturer and model number (or some other identifying characteristic, such as CB type, class, universal ID) of one or more of the mechanical CBs located (or to be deployed) downstream from the SSCB 102. (Note that method 1100 can be used and performed after the downstream mechanical CBs 104 have been installed in the electrical distribution system 100, before the downstream mechanical CBs 104 have been installed (for example, during the design of the electrical distribution system 100), or in a process of replacing one or more of the downstream mechanical CBs 104 with one or more other mechanical CBs, after the electrical distribution system 100 has been designed and the downstream mechanical CBs 104 have been installed (e.g., when replacing a mechanical CB 104 that has become inoperable or that is not compatible with the intended or desired coordination with another mechanical CB.) In response to the user's command at step 1102 to open and display the CB-select window 1202, at step 1104 the user computer 906 generates and displays the requested CB-select window 1202 on the user computer's display 1008. After the user's identifies and selects a downstream mechanical CB from the dropdown menu system 1204 in step 1106, at decision 1108 the user computer 906 determines whether the user has identified and selected any additional downstream mechanical CBs 104 from the dropdown menu system 1204. Once the user computer 906 determines that the user has finished identifying/selecting downstream mechanical CBs 104, at step 1110 the user computer 906 then accesses a 'CB time-current library' stored in the nonvolatile memory portion of the CRM 1004 of the SSCB 102 (alternatively, stored in a database in the mass storage device 1010). In one embodiment of the invention, illustrated in FIG. 13, the CB time-current library 1300 includes a plurality of mechanical CB manufacturers, model numbers and corresponding current rating and times it takes for each mechanical CB to trip (i.e., "trip times") when passing a given RMS current (in this example 600A RMS). (Note that the exemplary CB time-current library depicted in FIG. 13 provides a single trip time for each CB at a single RMS current (600A RMS). Since the trip time of a given mechanical CB can vary depending on the magnitude of current passing through it, in another embodiment of the invention a multi-dimensional CB time-current library containing a plurality of current-dependent trip times for each mechanical CBs 104 is used.) Next, at step 1112, the user computer 906 determines, from the information stored in the CB time-current library 1300, which downstream mechanical CB among the downstream mechanical CBs that was/were selected/identified by the user is the slowest (i.e., has the longest trip time). Then, at step 1114 the user computer 906 retrieves the trip time and current rating of the determined slowest downstream mechanical CB 104 from the CB time-current library. Finally, at step 1116 the user computer 906 commands the microcontroller 204 in the SSCB 102, via the comm/control bus 908, to set the SC pulse count Z in the SC pulse counter to a count that is commensurate with the retrieved trip time and directs the microcontroller 204 in the SSCB 102 to set the lower RMS current limit $i_{low}$ of the pulsed short circuit current $i_{pulsed}$ based on the retrieved current rating. The selective coordination method 500 is then performed using these user-defined time and current parameters. For example, if SSCB 102 has a short circuit trip current of 800A, the current rating and retrieved trip time of the slowest user-selected/identified mechanical CB 104 are 200A (RMS) and 10 ms, respectively, the user computer 906 can direct the microcontroller 204 in the SSCB 102 to set the SC pulse count Z so that the SC pulse counter counts for a little longer than the retrieved trip time of 10 ms and configure the hysteresis control loop so that the effective pulsed short circuit current $i_{pulsed,eff}$ is greater than (e.g., some multiple of) the retrieved current rating (e.g., $i_{pulsed,eff}=3\times200A$ (RMS)=600A RMS). According to this example, since the SSCB 102 has a trip current (800A RMS) greater than $i_{pulsed,eff}=600A$ RMS, the SSCB 102 will be prevented from tripping prematurely during a short circuit event and the mechanical CB 104 just upstream from the location of the short circuit will trip to isolate the short circuit. The solid-state device 202 in the SSCB 102 will be switched OFF (i.e., will trip) only if none of the downstream mechanical CBs 104 is able to trip and isolate the short circuit within the time set by the maximum SC pulse count Z.

Figure 14:
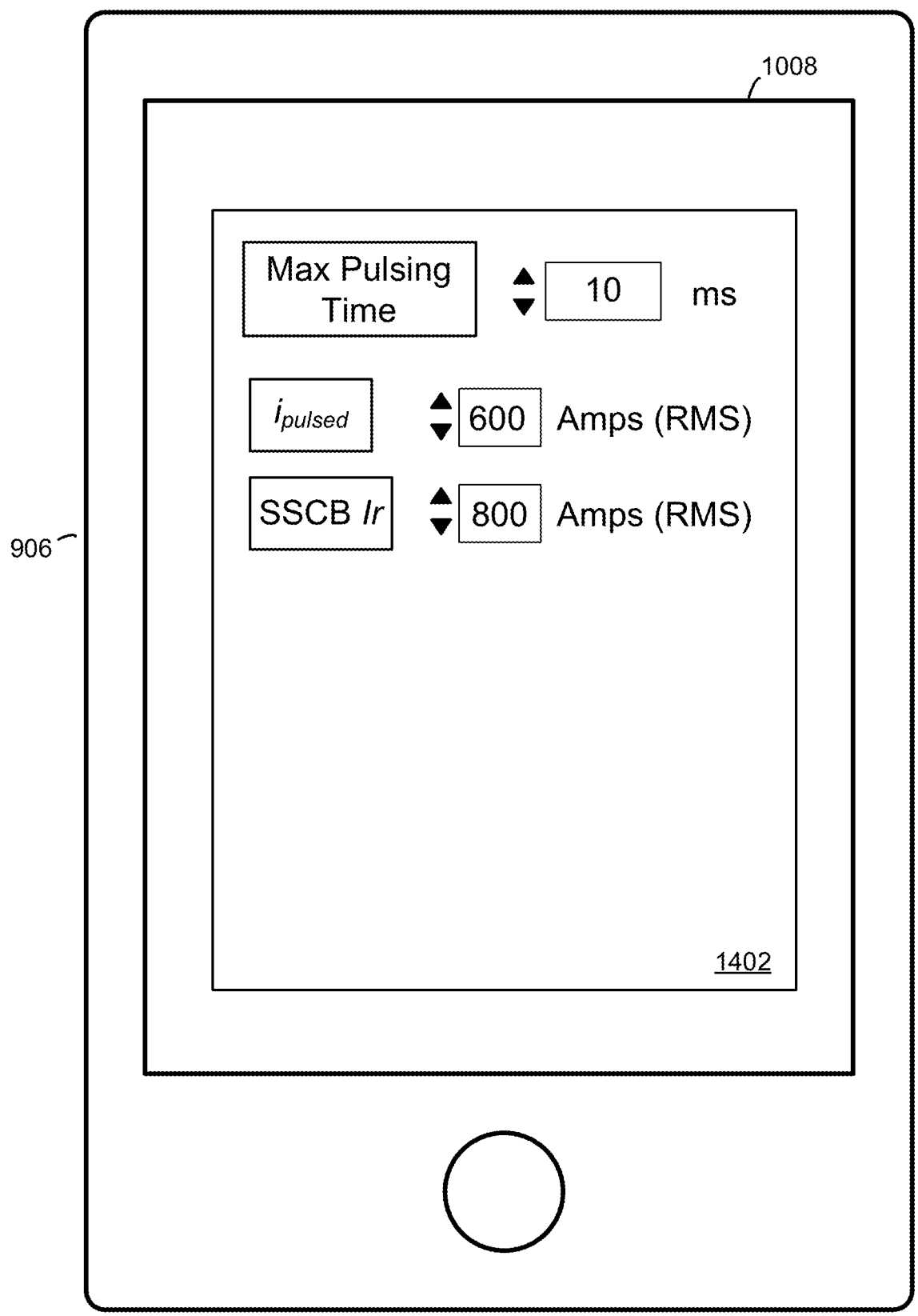
FIG. 14 is a drawing showing an exemplary user-interactive window the user computer depicted in FIGS. 9 and 10 generates and displays on the user computer's display and a user manipulates to affect the max pulsing time and RMS value of the pulsed short circuit current $i_{pulsed}$ used in the selective coordination method depicted in FIG. 5, in accordance with one embodiment of the present invention.

In the exemplary embodiment of the invention described above, the user computer 906 computes and sets the maximum SC pulse count Z based on the manufacturer/model time-current data recorded in the CB time-current library 1300 and the effective pulsed short circuit current $i_{pulsed,eff}$ regulated by the hysteresis control loop is determined depending on the time-current information cataloged in the CB time-current library 1300. In another embodiment of the invention, the user computer 906 is programmed so that a user can set the desired effective pulsed current $i_{pulsed,eff}$ and maximum SC pulse count Z directly, i.e., without the user computer 906 having to first access a CB time-current library. In other words, the user computer 906 is programmed to generate and display on the user computer display 1008 a user-interactive window that the user can manipulate to directly enter both the max pulsing time used by the SC pulse counter and RMS value of the desired effective pulsed current $i_{pulsed,eff}$. FIG. 14 is a drawing illustrating an exemplary GUI window 1402 the user computer 906 generates and displays on the user computer's display 1008 to allow the user to directly enter these time and current parameters. (Note that the GUI window 1402 may also optionally include GUI widgets and controls that allow the user to adjust the current rating Ir of the SSCB 102.) This alternative approach to defining the time and current parameters used in the selective coordination method 500 is useful for more advanced users, for example, engineers with a detailed knowledge of the electrical distribution system 100, and is an approach that can be used for design and diagnostic purposes. Further, because this approach allows more direct and specific control over the selective coordination time and current parameters, it can be used as a tool to 'fine-tune' the maximum SC pulse count Z and/or effective pulsed short circuit current $i_{pulsed,eff}$, for example, following an initial rough coordination performed according to methods 1100 and 500.

One side benefit of performing the selective coordination method 500 is that the number of counts counted by the SC pulse counter up to the time the short circuit is isolated can provide an indication of where in the electrical distribution system 100 the short circuit occurred. For example, if the maximum SC pulse count Z is set based on a first mechanical CB 104 having a trip time of 10 ms but during current pulsing a second mechanical CB 104 further downstream trips and isolates the short circuit in 5 ms, the number of counts counted up to the time of tripping provides an indication that the short circuit is not only downstream from the first, slower mechanical CB 104 but also downstream from the second mechanical CB 104 (or downstream from some other mechanical CB 104 also having a trip time of 5 ms). In one embodiment of the invention the number of counts counted by the SC pulse counter (or other related information) is transmitted by the microcontroller 204 to the user computer 906 (via the comm/control bus 908). With this information, the user can then determine which mechanical CB 104 (or which type, rating or class of mechanical CB) in the electrical distribution system 100 tripped and pinpoint (or at least determine the general location of) the source of the short circuit in the electrical distribution system 100.

Figure 15:
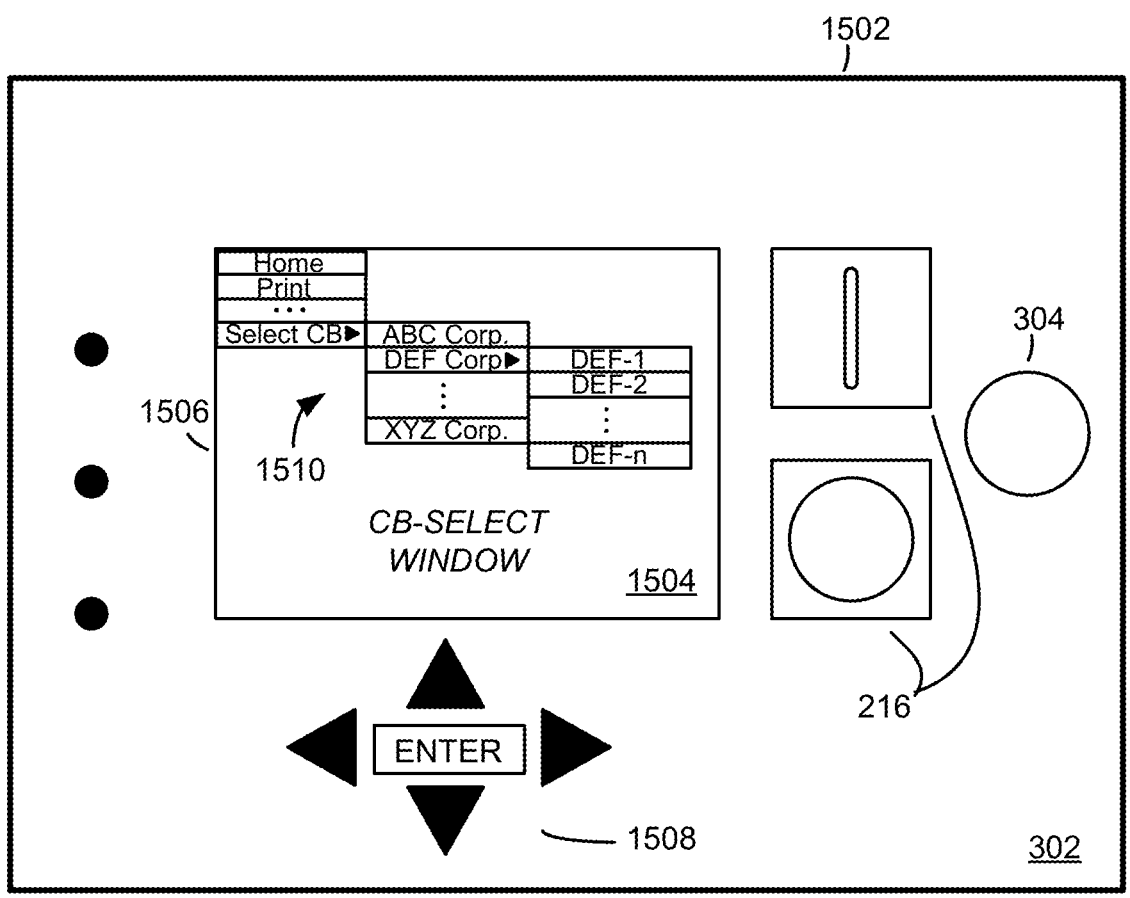
FIG. 15 is a drawing of the front face of an exemplary SSCB, highlighting a CB-select window that a microcontroller in the SSCB generates and displays on a display of the SSCB and a user manipulates to affect the max pulsing time and RMS value of the pulsed short circuit current $i_{pulsed}$ used in the selective coordination method depicted in FIG. 5, in accordance with one embodiment of the present invention.

In the exemplary embodiments of the invention described above, an external computer—"user computer 906"—is provided to allow a user to affect and modify the firmware stored in the nonvolatile memory of the SSCB 102, including the various time and current parameters used in the selective coordination method 500 such as the maximum SC pulse count Z, lower and uppers RMS current limits $i_{low}$ and $i_{up}$, effective pulsed short circuit current $i_{pulsed,eff}$, and/or SSCB current rating Ir. In an alternative embodiment of the invention, this user-interactive capability is built into the SSCB 102 itself, thus obviating the need for a user computer and comm/control bus. According to this alternative embodiment, the SSCB is modified to include a user-interactive display 1506 and a control panel 1508, such as in the exemplary SSCB 1502 depicted in FIG. 15, and the nonvolatile memory in the modified SSCB 1502 is adapted to store computer program instruction that the SSCB's microcontroller 204 executes to allow the user to affect and modify the various time and current parameters used in the selective coordination method 500. (Note: The display 1506 could be designed to include touchscreen technology, thus eliminating the need for a separate control panel 1508, or the SSCB 1502 could be designed to include both a separate control panel 1508 and a display 1506 with touchscreen technology.) The computer program instructions stored in the SSCB's 1502's nonvolatile memory include instructions the microcontroller 204 executes to generate and display user-interactive icons, menus, etc. on the SSCB's display 214 (for example a 'CB-select window' 1504 having a user-interactive dropdown menu system 1510, as illustrated in FIG. 15), as well as instructions the microcontroller 204 executes in response to directions, commands and input from the user via the control panel 1508 (and/or touchscreen, if the SSCB 1502 is equipped with touchscreen technology) that affect the various time and current parameters used in the selective coordination method 500.

Figure 16:
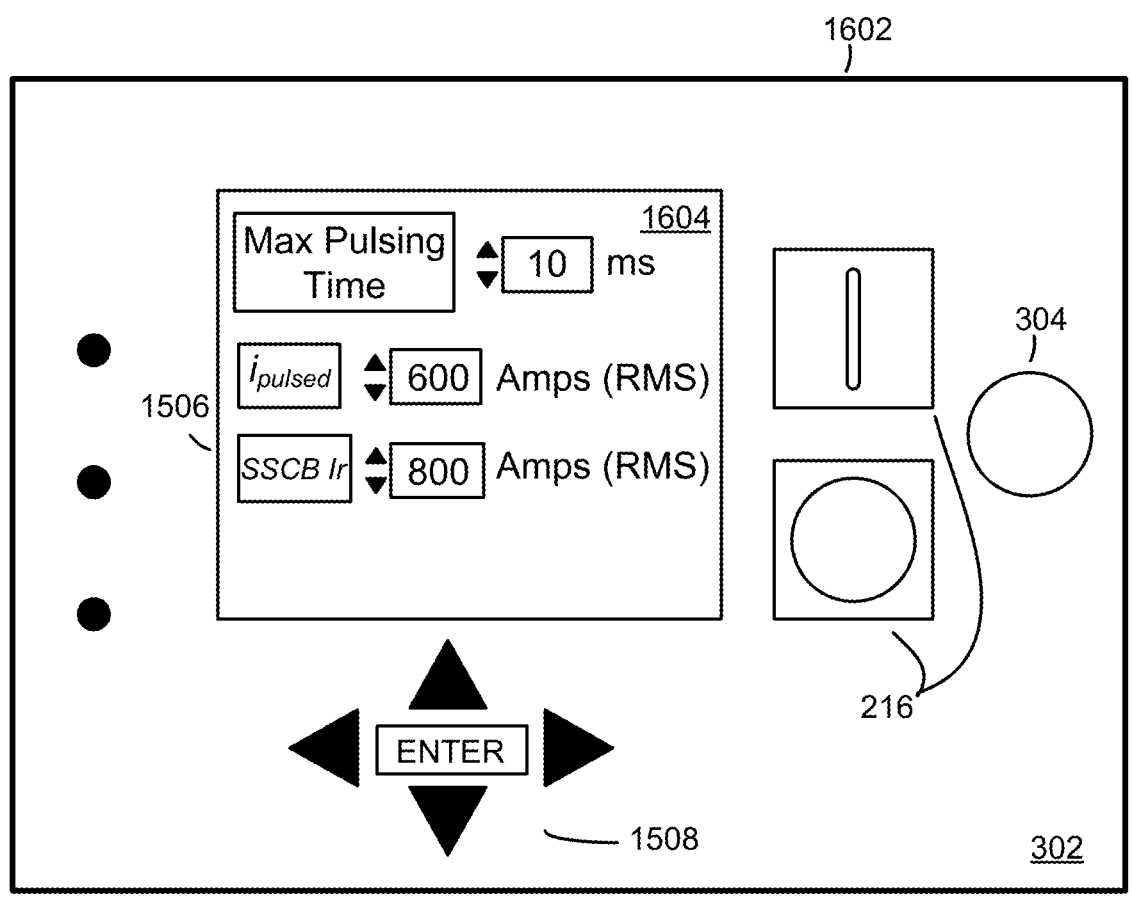
FIG. 16 is a drawing of the front face of an exemplary SSCB, highlighting a user-interactive window that a microcontroller in the SSCB generates and displays on a display of the SSCB a user manipulates to affect the max pulsing time and RMS value of the pulsed short circuit current $i_{pulsed}$ used in the selective coordination method depicted in FIG. 5, in accordance with one embodiment of the present invention.

In yet another embodiment of the invention (see FIG. 16), the SSCB 1602 is programmed so that its microcontroller 204 generates and displays a user-interactive window 1604 the user can manipulate to directly enter (i.e., without requiring the microcontroller 204 to first access a CB time-current library) the maximum pulsing time, effective pulsed short circuit current $i_{pulsed,eff}$, and current rating Ir of the SSCB 1602. This approach to setting or adjusting the various time and current parameters used in the selective coordination method 500 is similar to the approach described above in reference to FIG. 14, except that no user computer 906 or comm/control bus 908 is required to make the settings or adjustments.

While various embodiments of the present invention have been described, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments but, instead, should be determined by the appended claims, including the full scope of equivalents to which such claims are entitled.

The invention claimed is:

1. An electrical distribution system, comprising:
   one or more mechanical circuit breakers (CBs); and
   a solid-state circuit breaker (SSCB) disposed upstream from the one or more mechanical CBs configured to serve as a main circuit breaker, the SSCB including:
   a processor;
   a solid-state switching device through which a main current flows;
   a driver circuit configured to control an ON/OFF status of the solid-state switching device;
   and a computer-readable medium having computer program instructions stored thereon, which when executed by the processor cause the processor to:
   direct the driver circuit to repeatedly switch the solid-state switching device ON and OFF during short circuit events;
   count a number of short circuit current pulses generated by repeatedly switching the solid-state switching device ON and OFF during a given short circuit event; and
   direct the driver circuit to switch the solid-state switching device OFF permanently if the number of pulses counted in the given short circuit event exceeds a maximum short circuit pulse count.

2. The electrical distribution system of claim 1, wherein the computer program instructions include instructions which when executed by the processor cause the processor to cause the driver circuit to limit a root-mean-square (RMS) value of a pulsed short circuit current resulting from repeatedly switching the solid-state switching device ON and OFF to an RMS value low enough to prevent the SSCB from tripping prematurely and high enough to allow one of the mechanical CBs downstream from the SSCB to trip and isolate the short circuit.

3. The electrical distribution system of claim 2, wherein the computer program instructions include instructions which when executed by the processor allow the processor to communicate with and be controlled by an external user computer, via a communications and control (comm/control) bus, and instructions which when executed by the processor cause the processor to adjust the maximum short circuit pulse count in response to a user's command, direction and input entered via a human-machine interface (HMI) of the user computer.

4. The electrical distribution system of claim 3, wherein the computer program instructions include instructions which when executed by the processor cause the processor to adjust the RMS value of the pulsed short circuit current in response to the user's command, direction and input entered via the HMI of the user computer.

5. The electrical distribution system of claim 2, wherein the computer program instructions include instructions which when executed by the processor cause the processor to generate and display a user interface on a display of the SSCB that a user can manipulate to affect the maximum short circuit pulse count.

6. The electrical distribution system of claim 2, wherein the computer program instructions include instructions which when executed by the processor cause the processor to generate and display a user interface on a display of the SSCB that the user can manipulate to affect the RMS value of the pulsed short circuit current.

7. The electrical distribution system of claim 1, wherein the computer program instructions include instructions which when executed by the processor cause the processor to direct the driver circuit to restrict switching the solid-state switching device ON and OFF during short circuit events to two times in each cycle of a line voltage waveform in which a magnitude of the line voltage is less than a predetermined voltage threshold.

8. A solid-state circuit breaker (SSCB), comprising:
a solid-state switching device;
a driver circuit configured to control whether the solid-state switching device is switched ON or switched OFF; and
a microcontroller configured to direct the driver circuit to rapidly switch the solid-state switching device ON and OFF during a short circuit event in an electrical distribution system within which the SSCB is deployed, to reduce a root-mean-square (RMS) value of a short-circuit current flowing through the solid-state switching device during the short circuit event, wherein the microcontroller is configured to direct the driver circuit to switch the solid-state switching device OFF permanently if, after a predetermined number of times the solid-state switching device is switched ON and OFF during the short circuit event, the short circuit event has not been cleared by another circuit breaker located downstream from the SSCB in the electrical distribution system.

9. The SSCB of claim 8, wherein the microcontroller is configured to limit a number of times the driver circuit switches the solid-state switching device ON and OFF during the short circuit event.

10. The SSCB of claim 8, further comprising one or more surge protection devices connected to a Line-OUT side of the solid-state switching device configured to dissipate inductive currents generated during times the solid-state switching device is being switched ON and OFF during the short circuit event.

11. A solid-state circuit breaker (SSCB), comprising:
line-side terminals for receiving electrical power from an electrical power source;
load-side terminals for distributing electrical current to one or more downstream mechanical circuit breakers (CBs);
a solid-state switching device coupled between the line-side and load-side terminals through which the electrical current flows;
a processor; and
a nonvolatile memory configured to store instructions which when executed by the processor determine and control whether the solid-state switching device is ON or OFF,
wherein the instructions further comprise instructions that cause the processor to direct the solid-state switching device to pulse a short-circuit current flowing through the solid-state switching device during a short-circuit event and thereby limit a root-mean-square (RMS) value of the short-circuit current to a value low enough to prevent the SSCB from tripping prematurely but a value high enough to allow one of the downstream mechanical CB s to trip and isolate the source of the short circuit, and direct the processor to activate an internal short-circuit pulse counter that counts pulses of the pulsed short-circuit current during the short-circuit event, and instructions that direct the processor to switch the solid-state switching device OFF permanently if one of the downstream mechanical CBs does not, or is unable to, trip and isolate the short circuit after a maximum short-circuit pulse count.

12. The SSCB of claim 11, further comprising a hysteresis control apparatus that regulates the short-circuit current during the short-circuit event and produces an effective RMS pulsed short-circuit current.

13. The SSCB of claim 12, wherein the instructions executed by the processor include instructions that allow a user to manually and directly set the maximum short-circuit pulse count or effective RMS pulsed short-circuit current.

14. The SSCB of claim 13, wherein the SSCB further includes a user-interactive control panel and display, and the instructions executed by the processor include instructions that allow a user to modify and adjust time and current characteristics of the SSCB.

15. The SSCB of claim 14, wherein the time and current characteristics of the SSCB include the maximum short-circuit pulse count and/or effective RMS pulsed short-circuit current.

16. The SSCB of claim 11, wherein a number of pulses counted by the internal short-circuit pulse counter, from the time the short-circuit event commenced up to the time one of the downstream mechanical CB s trips to isolate the source of the short circuit, is used to identify an approximate physical location of the source of the short circuit.

17. The SSCB of claim 12, wherein the SSCB further includes a communications and control (comms/control) bus and a head-end interface over and through which a user of an external computer can manually set or adjust the maximum short-circuit pulse count and/or the effective RMS pulsed short-circuit current.

18. The SSCB of claim 12, wherein the nonvolatile memory is further configured to store a user-selectable mechanical CB database containing time-current information of a plurality of commercially available mechanical CBs, and the processor is configured to set the maximum short-circuit pulse count and/or the effective RMS pulsed short-circuit current depending on one or more user-identified mechanical CBs.

* * * * *

UNITED STATES PATENT AND TRADEMARK OFFICE
CERTIFICATE OF CORRECTION

PATENT NO. : 11,810,744 B2
APPLICATION NO. : 17/235164
DATED : November 7, 2023
INVENTOR(S) : Denis Kouroussis et al.

It is certified that error appears in the above-identified patent and that said Letters Patent is hereby corrected as shown below:

On the Title Page

At (22), replace "May 10, 2023" with --April 20, 2021--.

Signed and Sealed this
Nineteenth Day of December, 2023

Katherine Kelly Vidal
*Director of the United States Patent and Trademark Office*